United States Patent
Mihara et al.

(10) Patent No.: US 9,049,278 B2
(45) Date of Patent: Jun. 2, 2015

(54) SCREEN DISPLAY PROCESSING APPARATUS AND METHOD

(75) Inventors: Isao Mihara, Tokyo (JP); Miwako Doi, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1437 days.

(21) Appl. No.: 12/050,126

(22) Filed: Mar. 17, 2008

(65) Prior Publication Data

US 2009/0048001 A1  Feb. 19, 2009

(30) Foreign Application Priority Data

Aug. 14, 2007  (JP) .................................. 2007-211448

(51) Int. Cl.
    H04M 1/00   (2006.01)
    H04M 1/02   (2006.01)
    H04W 52/02  (2009.01)

(52) U.S. Cl.
    CPC .......... *H04M 1/0243* (2013.01); *H04W 52/027* (2013.01); *H04M 1/0266* (2013.01)

(58) Field of Classification Search
    CPC ............ H04W 52/027; H04M 1/0233; H04M 2201/38; H04M 1/0266
    USPC ........................ 455/550.1, 566, 575.3, 158.4; 379/93.17, 122, 136, 144.08, 167.12, 379/201.04, 247, 428.03, 433.04; 345/655, 345/469, 184, 204
    See application file for complete search history.

(56) References Cited

U.S. PATENT DOCUMENTS

| | | | |
|---|---|---|---|
| 5,712,966 A * | 1/1998 | Nadachi | 345/428 |
| 7,345,684 B2 * | 3/2008 | Gardos | 345/204 |
| 2003/0153283 A1 * | 8/2003 | Kuwazoe | 455/90 |
| 2004/0157647 A1 * | 8/2004 | Takahashi | 455/566 |
| 2005/0020325 A1 * | 1/2005 | Enger et al. | 455/575.3 |
| 2005/0093850 A1 * | 5/2005 | Mori et al. | 345/204 |
| 2006/0240875 A1 * | 10/2006 | Miyazawa | 455/566 |
| 2007/0070054 A1 * | 3/2007 | Nam et al. | 345/184 |
| 2007/0149262 A1 * | 6/2007 | Navntoft | 455/575.3 |
| 2007/0281675 A1 * | 12/2007 | Pletikosa et al. | 455/418 |

(Continued)

FOREIGN PATENT DOCUMENTS

| | | |
|---|---|---|
| JP | 7-50711 A | 2/1995 |
| JP | 2001-313700 A | 11/2001 |

(Continued)

OTHER PUBLICATIONS

Japanese Search Report dated Oct. 20, 2009 from corresponding application No. 2007-211448.
Japanese Office Action dated Nov. 29, 2011 from JP Patent Appln No. 2010-086491.

(Continued)

*Primary Examiner* — Andrew Wendell
(74) *Attorney, Agent, or Firm* — Ohlandt, Greeley, Ruggiero & Perle, L.L.P.

(57) ABSTRACT

A screen display processing apparatus used for a portable terminal apparatus includes a moving unit configured to relatively move a plurality of cases of the portable terminal apparatus, a detection unit configured to detect a parameter value representing a degree of relative movement of the cases, a determination unit configured to determine based on the parameter value whether a shape of the portable terminal apparatus changes, and a first control unit configured to control a function about the screen display provided in the portable terminal apparatus in accordance with the parameter value and the change or no change in the shape.

28 Claims, 29 Drawing Sheets

(56) References Cited

U.S. PATENT DOCUMENTS

| | | | | |
|---|---|---|---|---|
| 2008/0004083 A1* | 1/2008 | Ohki et al. | | 455/566 |
| 2008/0227502 A1* | 9/2008 | Barnett et al. | | 455/566 |
| 2008/0254822 A1* | 10/2008 | Tilley | | 455/550.1 |
| 2008/0284738 A1* | 11/2008 | Hovden et al. | | 345/173 |
| 2009/0303204 A1* | 12/2009 | Nasiri et al. | | 345/184 |
| 2012/0108272 A1* | 5/2012 | Miyamoto et al. | | 455/456.6 |

FOREIGN PATENT DOCUMENTS

| | | |
|---|---|---|
| JP | 2003-76333 | 3/2003 |
| JP | 2005-221660 A | 8/2005 |
| JP | 2007-114242 A | 5/2007 |

OTHER PUBLICATIONS

Japanese Office Action dated Feb. 14, 2012 from JP 2010-086491.

* cited by examiner

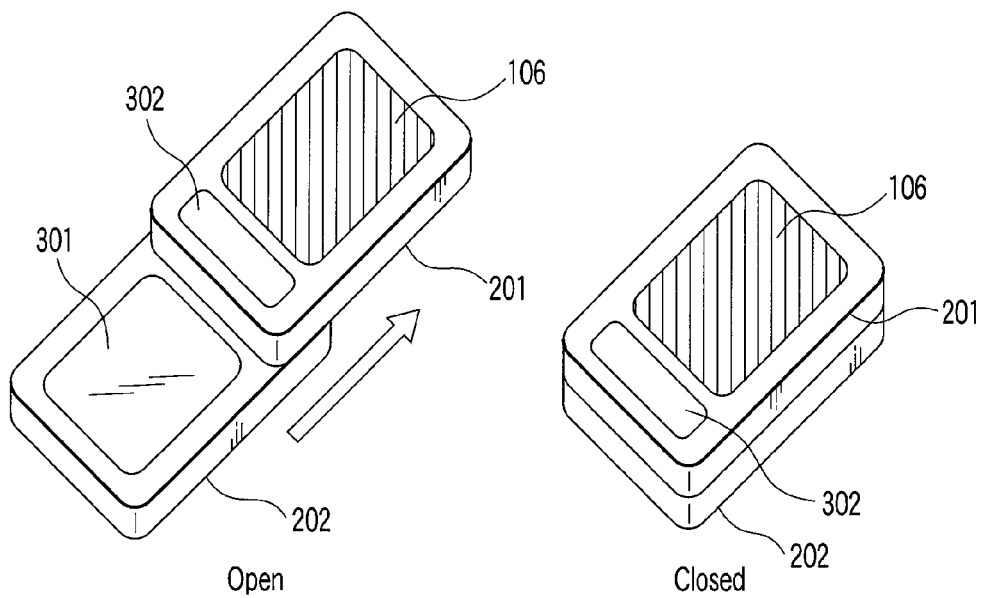
FIG. 3A  Open
FIG. 3B  Closed
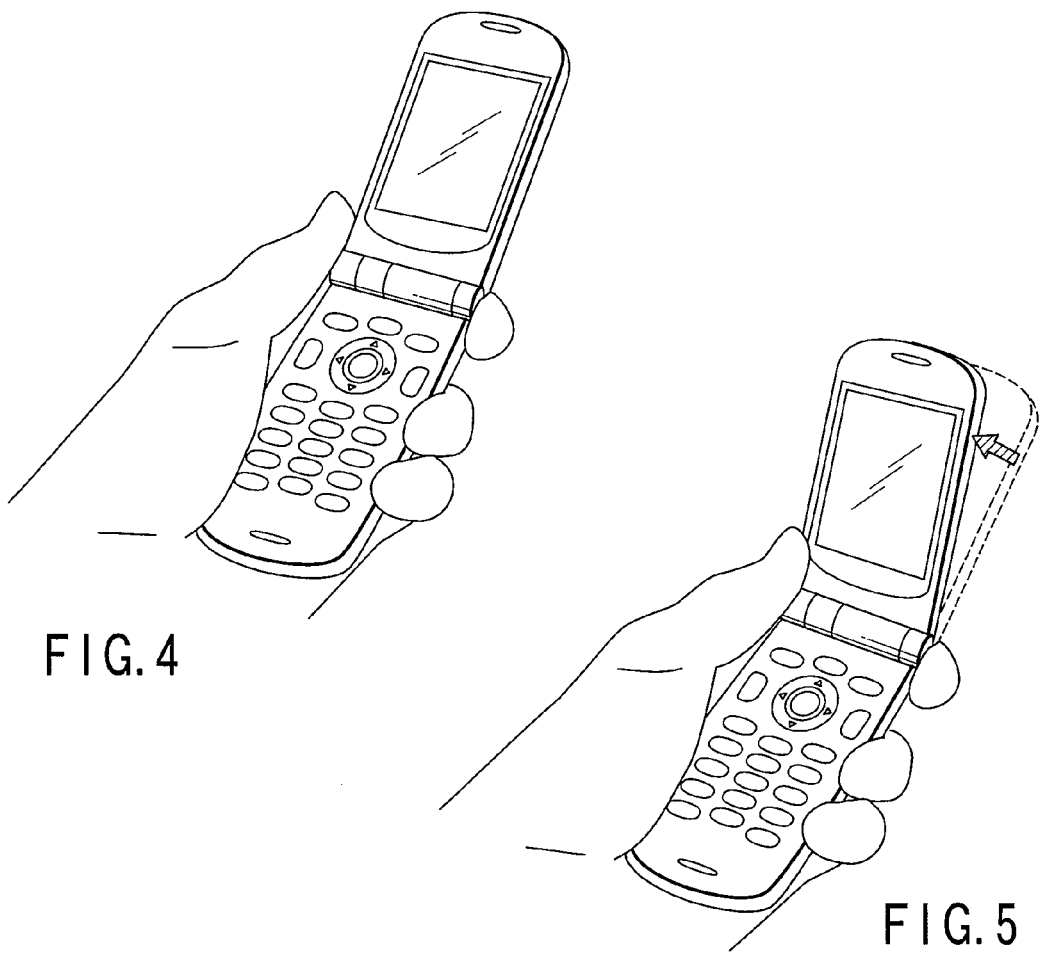
FIG. 4
FIG. 5

Screen seen when portable phone is nearly fully opened

Screen seen when portable phone is opened slightly

Timepiece application runs at center of screen

Timepiece application runs on upper side of screen, and display size is large

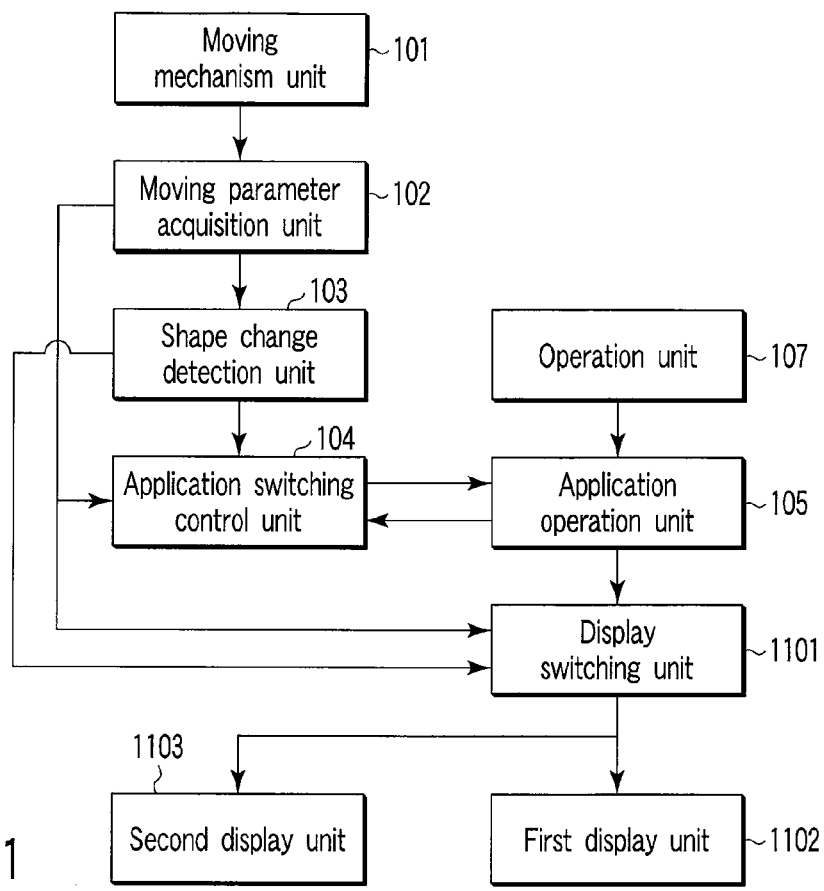
F I G. 11
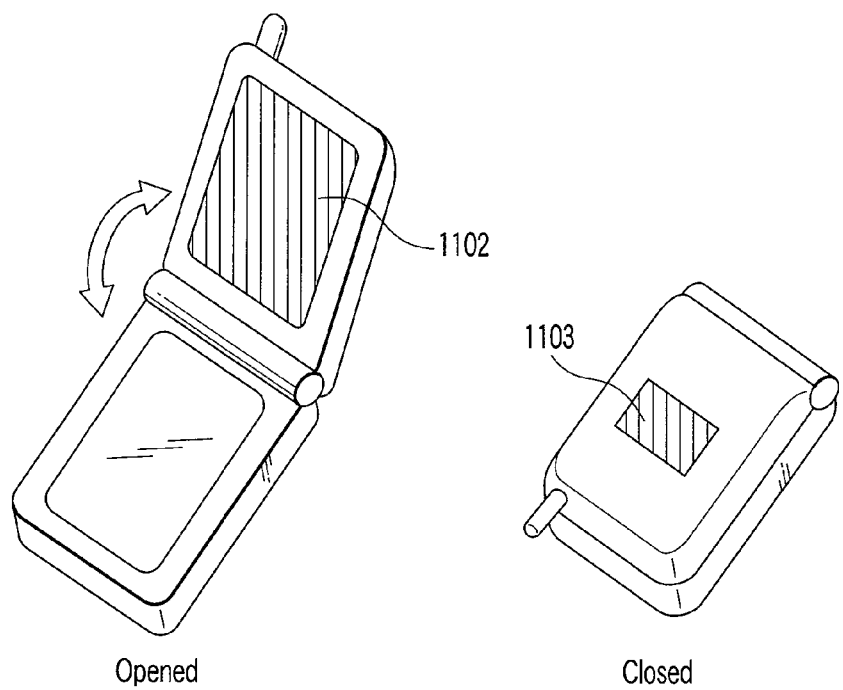
Opened
F I G. 12A
Closed
F I G. 12B

When angle made by upper case and lower case is large

When angle made by upper case and lower case is small

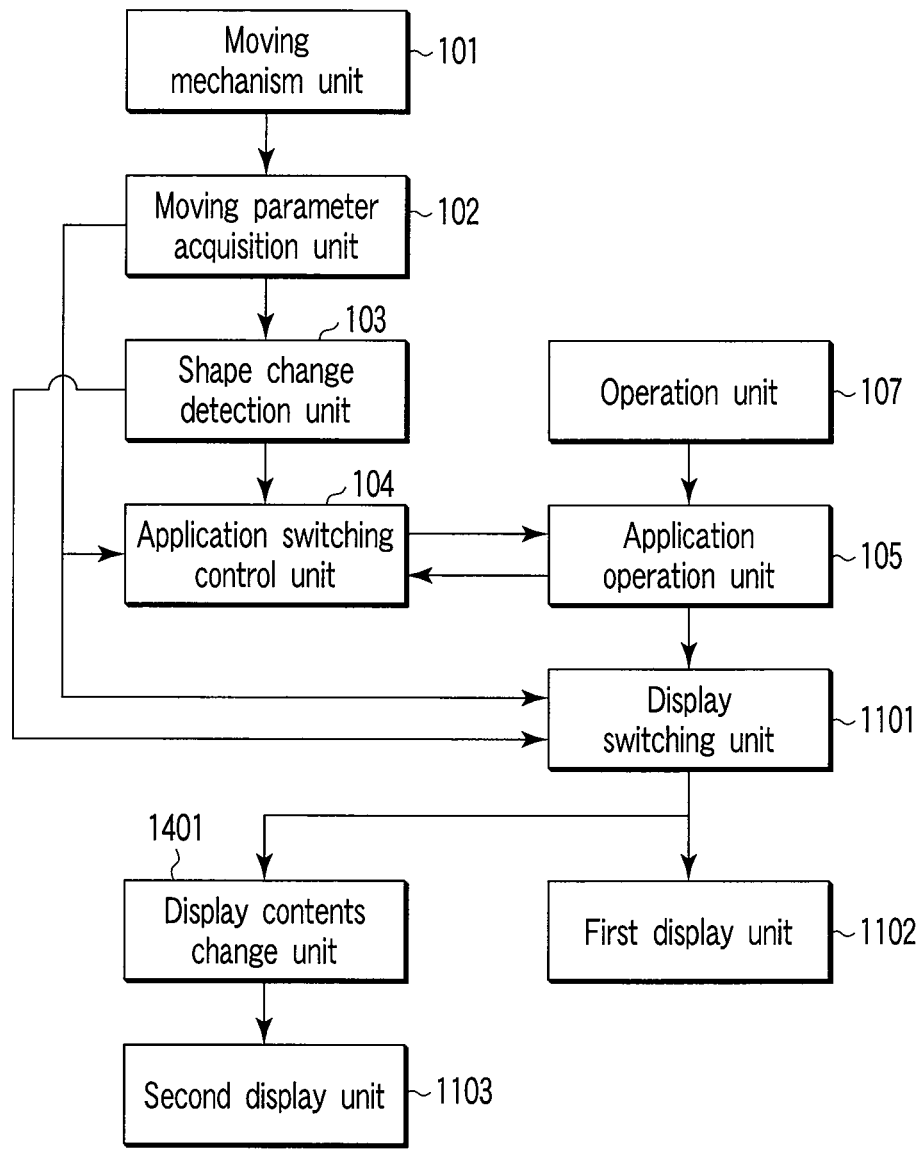
F I G. 14

When display area size is reduced without changing character size

When display area size is reduced, and character size is changed

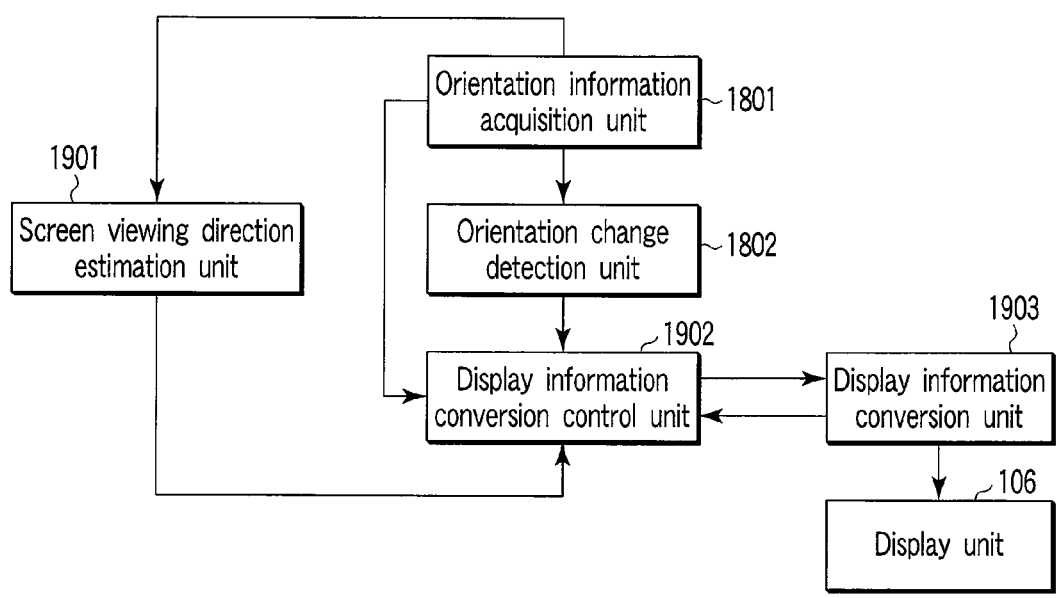
F I G. 19

Terminal is oriented in normal direction (upright)
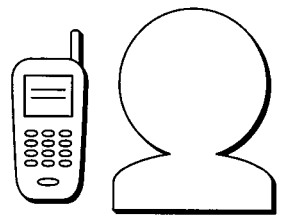
F I G. 20A
Terminal is reversed (inverted)
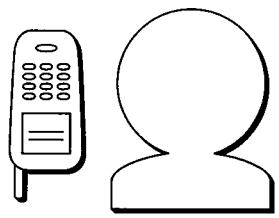
F I G. 20B
Terminal is laid down (rightward laid-down)
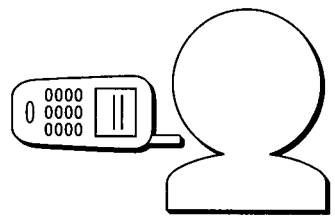
F I G. 20C Terminal is oriented in normal direction (upright)
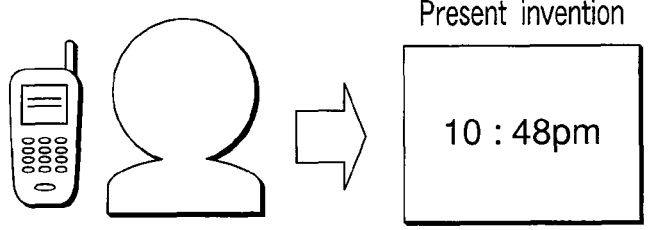 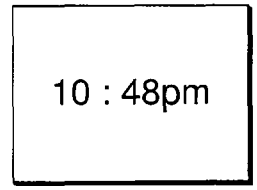
FIG. 21A
Terminal is reversed (inverted)
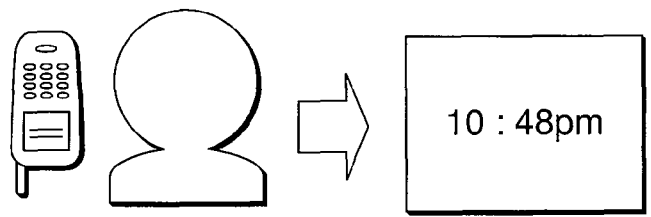 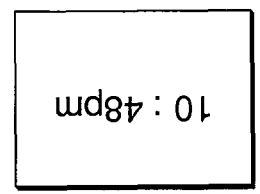
FIG. 21B
Terminal is laid down (rightward laid-down)
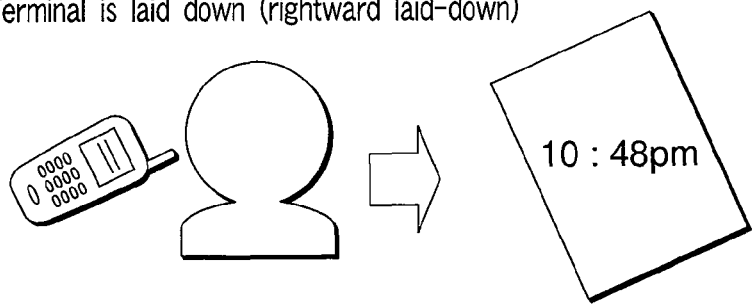 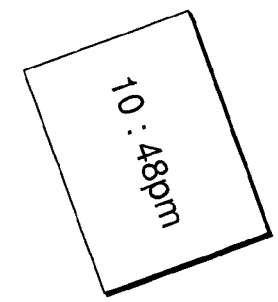
FIG. 21C

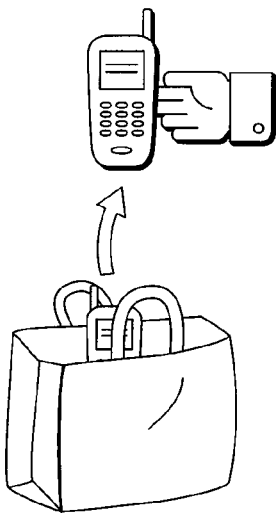
Take out portable phone in upright state
FIG. 22A
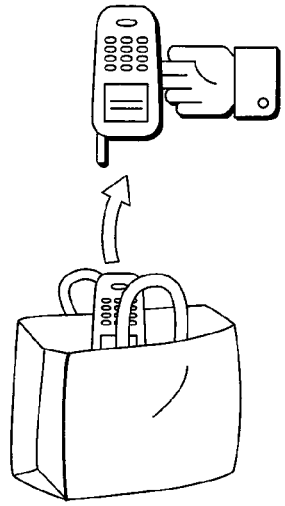
Take out portable phone in inverted state
FIG. 22B
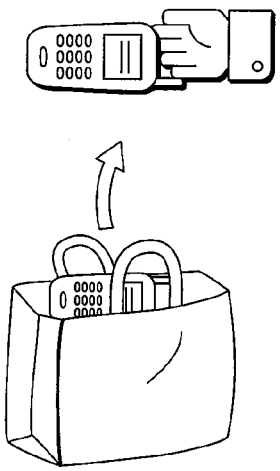
Take out portable phone in laid-down state
FIG. 22C
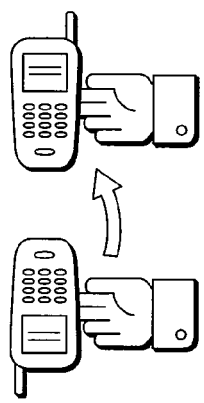
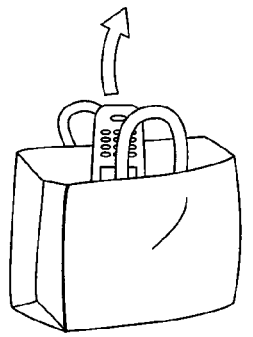
Change orientation from inverted state to upright state
FIG. 22D
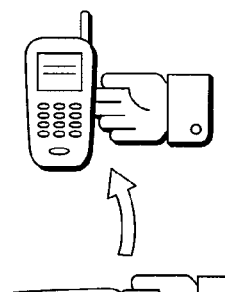
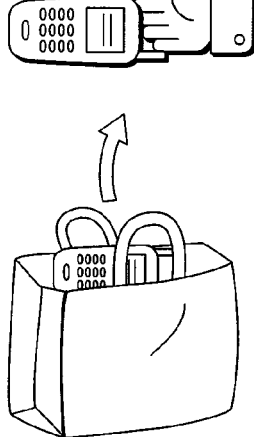
Change orientation from laid-down state to upright state
FIG. 22E Example of orientation of portable phone and screen seen from user's viewing direction Character information user can see on display unit Conversion example by display information conversion unit Converted character information user can see on display unit

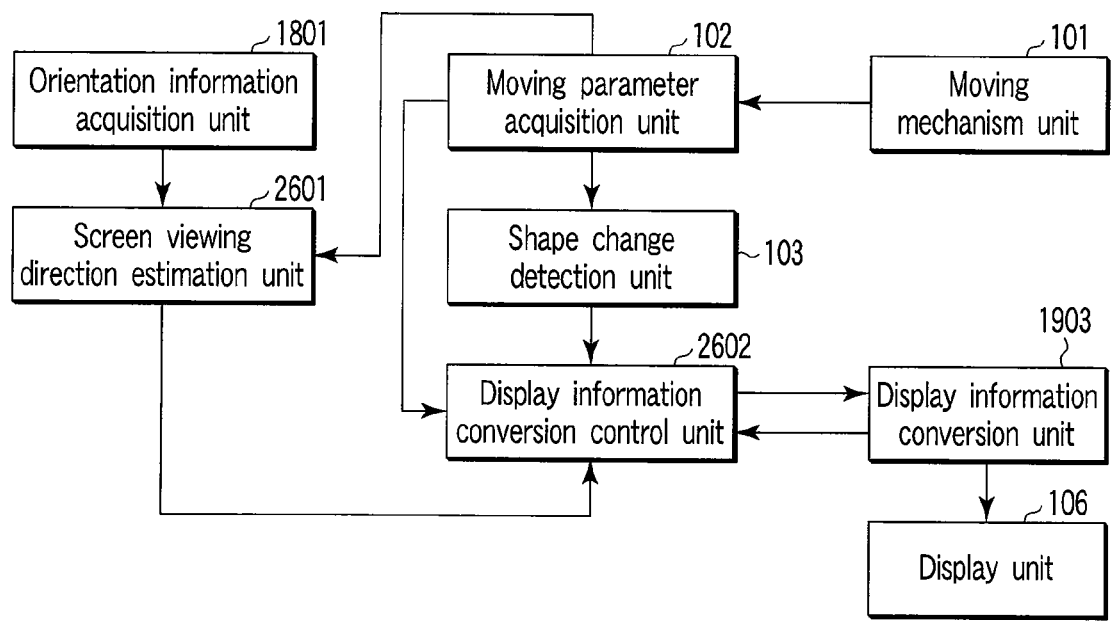
F I G. 26

Portable phone is opened while placing lower case on lower side

Portable phone is opened while placing upper case on lower side

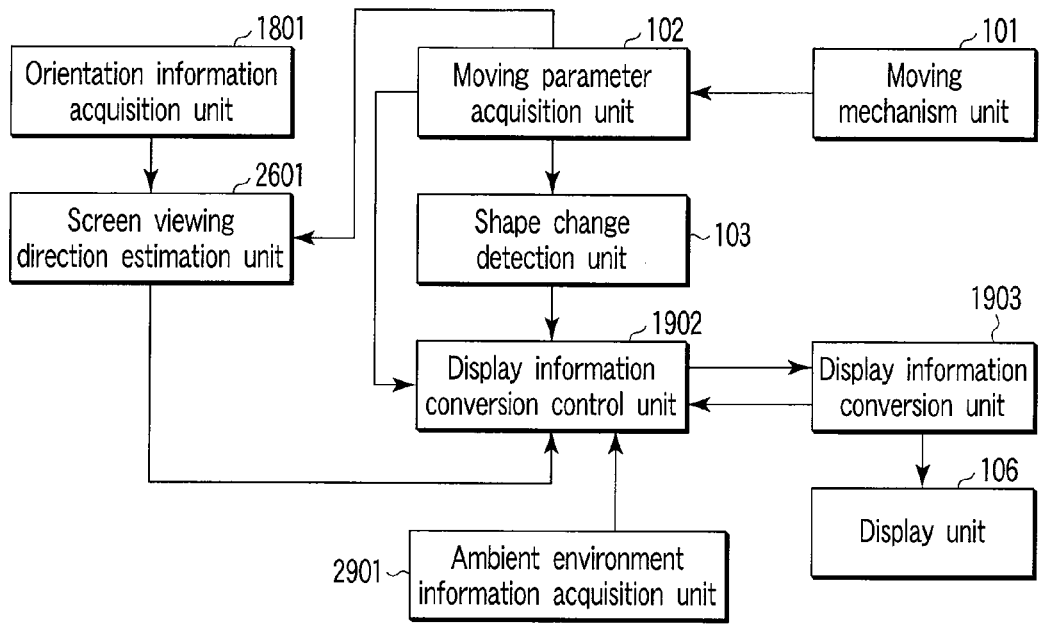
F I G. 32
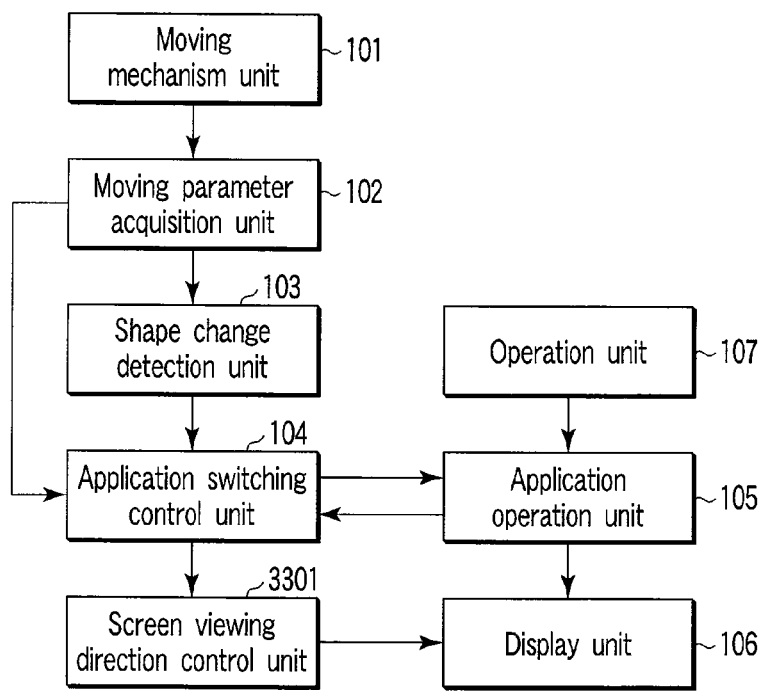
F I G. 33

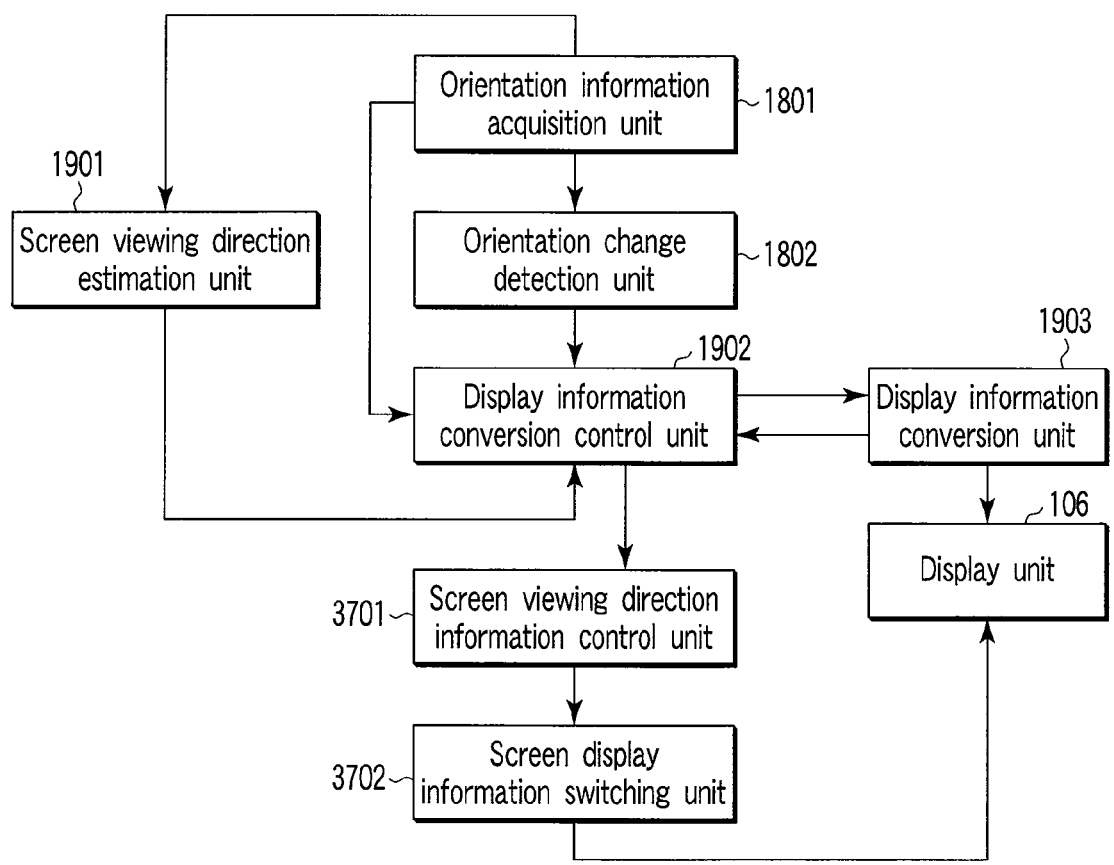
F I G. 39

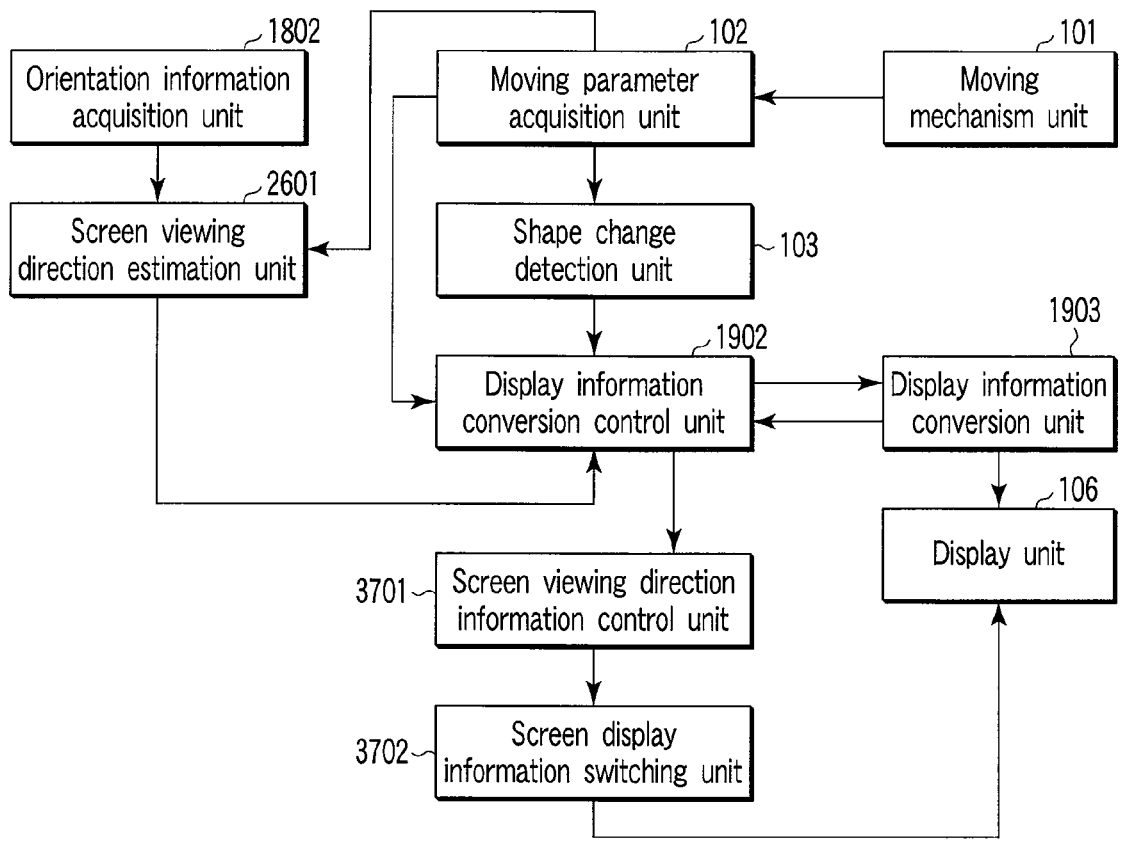
F I G. 40

SCREEN DISPLAY PROCESSING APPARATUS AND METHOD

CROSS-REFERENCE TO RELATED APPLICATIONS

This application is based upon and claims the benefit of priority from prior Japanese Patent Application No. 2007-211448, filed Aug. 14, 2007, the entire contents of which are incorporated herein by reference.

BACKGROUND OF THE INVENTION

1. Field of the Invention

The present invention relates to a screen display processing apparatus and method used in a portable phone or an equivalent portable information terminal.

2. Description of the Related Art

Portable phones are now quite widespread, and now include various advanced functions, the operability of which is correspondingly becoming more complex. However, the basic mode of operation of portable phones has not changed that drastically, as they are still mostly operated by buttons. Further, even if a user wishes to perform a simple task on a portable phone, several buttons must be pressed. That is, the user has to operate the portable phone by using only a menu, a complex GUI, and ten or more buttons (ex. ten key type buttons or some of function buttons).

Further, CPUs of the type used in PCs cannot be used in portable phones, due to power consumption and cost considerations, so portable phones must incorporate a relatively low-power CPU. Additionally, since the screen needs to be compact for the sake of portability, the portable phone cannot have a high-resolution liquid crystal monitor like a PC. Because of these problems of hardware, the operation screen of the portable phone is not of a multitasking type that uses windows, which is the mainstream of PCs. Basically, when one application uses the whole screen, and another application is to be activated, the current application is ended, and the other application is started. Windows-type functionality can be used, but the number of functions is limited. However, application execution is fundamentally based on single tasking or pseudo multitasking.

For these reasons, the portable phone is often very inconvenient for a user who wants to perform a simple operation or access another piece of information, because of the problems of system configuration (in terms of both hardware and software) and operability.

On the other hand, the mechanism in the case design of a portable phone is evolving from day to day. In addition to the current mainstream folding type, portable phones with various shapes or configurations are available, including a sliding type portable phone, a portable phone with a rotatable screen unit, and a portable phone that folds in a plurality of directions.

Although the case design evolves and provides various mechanisms, the system configuration remains unchanged, as described above. That is, the only part that features novelty is the mechanism. As the mechanism becomes more complex, the portable phone is frequently used in various forms. However, the screen display hardly improves visibility in each form.

Most portable phones simply incorporate the functions of a PC or other device. In fact, these functions are hardly user-friendly in consideration of the use situation unique to the portable phone. For example, a TV function or camera function is only a simple TV function or camera function that is not customized for each mode of use for a portable phone.

Additionally, the portable phone has a manner mode regarding sound but does not consider any manner mode for light leakage from, e.g., the backlight of the screen. In a dark place such as a movie theater where a movie is running, light leakage from a neighboring portable phone is considerably annoying. Some portable phones control the screen brightness by using a photosensor (e.g., JP-A 2003-076333 (KO-KAI)). However, this function aims not at providing a manner mode for light leakage in a dark place but at improving the visibility of the screen under, e.g., outdoor daylight.

Furthermore, the display screen of a portable phone has not experienced much of an evolution since its beginning, either. From the viewpoint of the above-described manner mode for light or to prevent people in the vicinity from seeing private information, many users now place a privacy film on the screen of the portable phone. Even in portable phones with such functionality incorporated into them, the screen display has not been improved to any great extent.

As described above, the portable phones currently available have various problems regarding the operability, user friendliness of applications, mechanism utilization, screen visibility, the manner mode for light leakage, and privacy protection in screen display.

BRIEF SUMMARY OF THE INVENTION

In accordance with an aspect of the invention, there is provided a screen display processing apparatus used for a portable terminal apparatus comprising: a moving unit configured to relatively move a plurality of cases of the portable terminal apparatus; a detection unit configured to detect a parameter value representing a degree of relative movement of the cases; a determination unit configured to determine based on the parameter value whether a shape of the portable terminal apparatus changes; and a first control unit configured to control a function about the screen display provided in the portable terminal apparatus in accordance with the parameter value and the change or no change in the shape.

In accordance with another aspect of the invention, there is provided a screen display processing apparatus used for a portable terminal apparatus comprising: an acquisition unit configured to acquire orientation information representing an orientation of at least one case of the portable terminal apparatus; a determination unit configured to determine based on the orientation information whether the orientation changes; and a control unit configured to control a function about the screen display provided in the portable terminal apparatus in accordance with the orientation information and the change or no change in the orientation.

In accordance with another aspect of the invention, there is provided a screen display processing apparatus used for a portable terminal apparatus comprising: an acquisition unit configured to acquire orientation information representing an orientation of at least one case included in the portable terminal apparatus; a determination unit configured to determine based on the orientation information whether the orientation changes; an estimation unit configured to estimate, based on the orientation information, a viewing direction in which a user of the portable terminal apparatus views a screen of the portable terminal apparatus; and a control unit configured to control a function about the screen display provided in the portable terminal apparatus in accordance with the orientation information, the viewing direction, and the change or no change in the orientation.

In accordance with another aspect of the invention, there is provided a screen display processing apparatus used for a portable terminal apparatus comprising: a moving unit configured to relatively move a plurality of cases of the portable terminal apparatus; a detection unit configured to detect a parameter value representing a degree of relative movement of the cases; a determination unit configured to determine based on the parameter value whether a shape of the portable terminal apparatus changes; an acquisition unit configured to acquire orientation information representing an orientation of at least one case of the portable terminal apparatus; an estimation unit configured to estimate, based on the parameter value, the orientation information, and the change or no change in the shape, a viewing direction in which a user of the portable terminal apparatus views a screen of the portable terminal apparatus; and a control unit configured to control a function about the screen display provided in the portable terminal apparatus in accordance with the viewing direction.

BRIEF DESCRIPTION OF THE SEVERAL VIEWS OF THE DRAWING

FIGS. 3A and 3B are views showing an example of the outer appearance of a sliding type portable phone terminal incorporating the screen display processing apparatus in FIG. 1;

FIG. 4 is a view showing an example of the outer appearance of the folding type portable phone terminal which is completely opened;

FIG. 5 is a view showing a state in which an upper case 201 of the portable phone terminal is slightly rotationally moved;

FIG. 11 is a block diagram of a screen display processing apparatus according to the fifth modification of the first embodiment;

FIGS. 12A and 12B are views for explaining a main screen and a sub screen;

FIG. 14 is another block diagram of the screen display processing apparatus according to the fifth modification of the first embodiment;

FIG. 19 is a block diagram of a screen display processing apparatus according to the third embodiment;

FIGS. 20A to 20C are views for explaining the relationship between the orientation of a portable phone terminal and the direction of the display screen;

FIGS. 21A to 21C are views for explaining the effect obtained when the orientation of the portable phone terminal and the direction of the display screen are changed;

FIGS. 22A to 22E are views for explaining the orientation of the portable phone terminal which is taken out from a bag and a state in which the user changes the holding position in using the portable phone terminal;

FIG. 26 is a block diagram of a screen display processing apparatus according to the fourth embodiment;

FIG. 32 is a block diagram of a screen display processing apparatus according to the fifth embodiment corresponding to the fourth embodiment;

FIG. 33 is a block diagram of a screen display processing apparatus according to the sixth embodiment corresponding to the first embodiment;

FIG. 39 is a block diagram of a screen display processing apparatus according to the first modification of the sixth embodiment corresponding to the third embodiment; and FIG. 40 is a block diagram of a screen display processing apparatus according to the first modification of the sixth embodiment corresponding to the fourth embodiment.

DETAILED DESCRIPTION OF THE INVENTION

Figure 1:
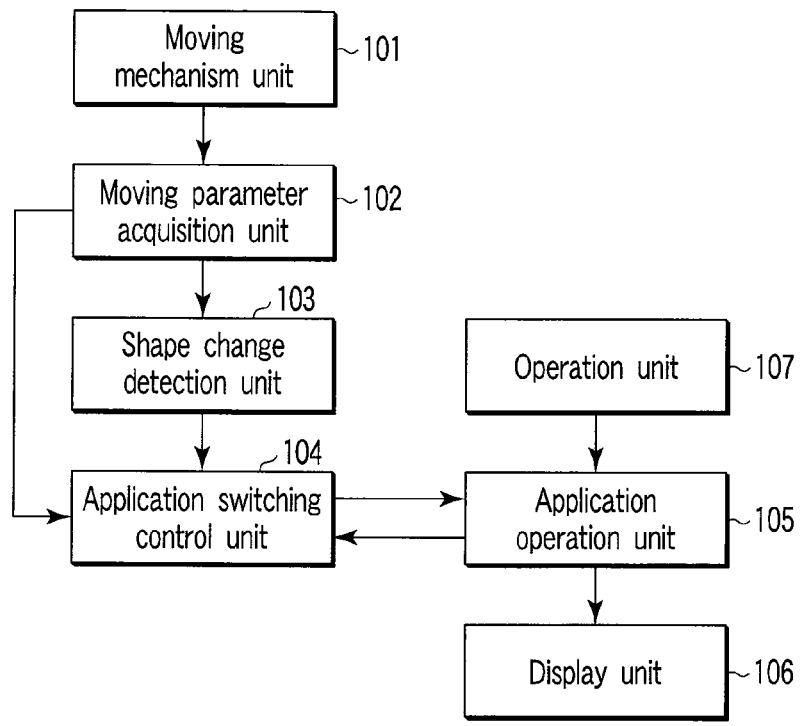
FIG. 1 is a block diagram of a screen display processing apparatus according to the first embodiment.

A screen display processing apparatus and method according to the embodiments of the present invention will be described below in detail with reference to the accompanying drawing. The same reference numerals denote parts that perform the same operations in the following description, and a description thereof will not be repeated.

The screen display processing apparatus and method of the embodiment allow appropriate screen display corresponding to a situation.

First Embodiment

<Overall Arrangement>

A screen display processing apparatus according to the first embodiment will be described with reference to FIG. 1.

The screen display processing apparatus of this embodiment includes a moving mechanism unit 101, moving parameter acquisition unit 102, shape change detection unit 103, application switching control unit 104, application operation unit 105, display unit 106, and operation unit 107.

The moving mechanism unit 101 relatively moves a plurality of cases which constitute an apparatus (e.g., a portable terminal apparatus such as a portable phone terminal) including the screen display processing apparatus. The moving mechanism unit 101 will be described later in detail with reference to FIGS. 2 and 3.

The moving parameter acquisition unit 102 acquires a moving parameter corresponding to the cases to enable the moving mechanism unit 101 to move them. The moving parameter acquisition unit 102 will be described later in detail.

The shape change detection unit 103 detects a change in the shape of the apparatus, including the screen display processing apparatus, on the basis of the moving parameter acquired by the moving parameter acquisition unit 102. The shape change detection unit 103 acquires, e.g., information representing the "presence" or "absence" of the shape change of the apparatus including the screen display processing apparatus. The shape change detection unit 103 will be described later in detail.

The application switching control unit 104 controls the functions of the apparatus, including the screen display processing apparatus, by using the information representing the "presence" or "absence" of the shape change detected by the shape change detection unit 103 and the moving parameter acquired by the moving parameter acquisition unit 102. In this embodiment, the application switching control unit 104 controls to switch the application running on the apparatus, including the screen display processing apparatus. The application switching control unit 104 will be described later in detail.

Upon receiving the control contents from the application switching control unit 104, the application operation unit 105 switches the application to a predetermined application and runs the application. The application operation unit 105 will be described later in detail.

The display unit 106 is a screen (e.g., Flat Panel Display (FPD)) capable of displaying text information and image information. The display unit 106 displays the operation status or result of the apparatus, including the screen display processing apparatus.

The operation unit 107 comprising various kinds of push-button keys executes dial input, character input, command input, and the like and outputs a key input signal corresponding to a key operation.

Figure 2:
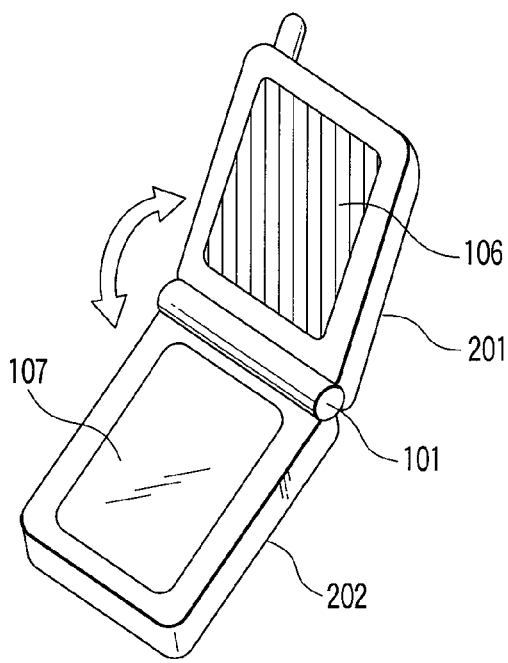
FIG. 2 is a view showing an example of the outer appearance of a folding type portable phone terminal incorporating the screen display processing apparatus in FIG. 1.

An example of the outer appearance of a portable phone terminal incorporating the screen display processing apparatus in FIG. 1 will be described next with reference to FIG. 2.

The portable phone terminal comprises an upper case 201 and a lower case 202. The upper case 201 and lower case 202 are connected to be (foldably) opened or closed via the moving mechanism unit 101. The upper case 201 has the display unit 106. The lower case 202 has the operation unit 107.

In the portable phone terminal, normally, various functional units (not shown) of the terminal operate in accordance with the operation on the operation unit 107, and the operation contents and result are output to the display unit 106. For example, when the user presses a "mail" key of the operation unit 107, the operation switches to a mail function application, and the display unit 106 displays the operation window of the mail application. When the user inputs characters using the operation unit 107 in this state, the mail application processes the input characters, and the display unit 106 successively displays the characters as a state during mail input. When the user presses a Web application button, the application switches to a Web application. The display unit 106 and operation unit 107 are used for display and operation of the Web application.

This embodiment is directed to a screen display processing apparatus included in such a portable phone terminal or an equivalent portable information terminal. The units included in the screen display processing apparatus of this embodiment will be described below in detail.

<Moving Mechanism Unit 101>

The moving mechanism unit 101 relatively moves the plurality of cases included in the terminal. More specifically, the portable phone terminal assumed in this embodiment has the upper case 201 and lower case 202, as shown in, e.g., FIG. 2, and the two cases are connected to be (foldably) opened or closed via the moving mechanism unit 101, as described above. The moving mechanism unit 101 is typically a hinge which moves and (foldably) opens or closes the upper case 201 and lower case 202 by a rotating mechanism. This is an example of a so-called folding type portable phone terminal.

As well as the folding type, there is a portable phone terminal of another form, which has the moving mechanism unit 101. FIGS. 3A and 3B show an example. This is a so-called sliding type portable phone terminal, which includes the moving mechanism unit 101 (not shown), display unit 106, first operation unit 301, second operation unit 302, upper case 201, and lower case 202.

The first operation unit 301 and second operation unit 302 are formed by dividing the function of the above-described operation unit 107 into two parts. The portable phone terminal of this type has a sliding mechanism in the moving mechanism unit 101. The sliding mechanism moves the upper case 201 and lower case 202 in the horizontal direction and (slidably) opens or closes them. FIG. 3A shows a state in which the portable phone terminal is fully open (when the cases are slid). FIG. 3B shows a state in which the portable phone terminal is closed (when the cases are not slid). The sliding type portable phone terminal is almost the same as the folding type portable phone terminal in terms of the functions, except for the opening/closing means.

Examples of the moving mechanism unit 101 in two types of portable phone terminals, i.e., the folding type and sliding type portable phone terminals have been described. These are merely examples, and the present embodiment is not limited to these. A portable phone terminal of any other type is applicable if it has a moving mechanism.

<Moving Parameter Acquisition Unit 102>

The moving parameter acquisition unit 102 acquires the moving parameter (parameter to be used to determine whether the plurality of cases move relatively) of the moving mechanism unit 101. In other words, the moving parameter acquisition unit 102 detects a parameter value to determine whether the plurality of cases move relatively. When the portable phone terminal is of the above-described folding type, i.e., the moving mechanism of the moving mechanism unit 101 is a rotating mechanism, a rotation angle, i.e., the angle made by the upper case 201 and lower case 202 is acquired as the moving parameter. When the portable phone terminal is of the above-described sliding type, i.e., the moving mechanism of the moving mechanism unit 101 is a sliding mechanism, a sliding amount, i.e., the moving amount of the lower case 202 with respect to the upper case 201 (or the moving amount of the upper case 201 with respect to the lower case 202) is acquired as the moving parameter. This also applies to any other moving mechanism. That is, a parameter serving as the moving amount of the moving mechanism is acquired. The number of parameters is not always one. When the cases move in a plurality of directions, a plurality of parameters can be acquired.

The following description will be given by exemplifying the folding type portable phone terminal for descriptive convenience. However, the description also applies to a portable phone terminal of any other type. That is, the embodiment can be implemented by replacing the moving mechanism and moving parameter in the following description with those of a terminal of each type.

<Shape Change Detection Unit 103>

The shape change detection unit 103 detects a change in the shape of the terminal on the basis of the moving parameter acquired by the moving parameter acquisition unit 102. On the basis of the parameter value, the shape change detection unit 103 determines whether the shape of the portable terminal apparatus has changed. A shape change is detected simply when the parameter value has changed from a given reference by a specific amount or more. For example, letting f(t) be the parameter value at a time t, f0 be the reference parameter value, and TH be the threshold value for change detection, a shape change can be detected by $$|f(t)-f0|>TH$$

That is, when |f(t)−f0| exceeds TH, it is determined that the shape has changed.

The shape change can also be detected by using the difference between the parameter value at the time t and that at a time t−Δt slightly before t (by Δt). When $$|f(t)-f(t-\Delta t)|>TH$$

it is determined that the shape has changed, and the change amount is detected as f(t)−f(t−Δt).

Instead of simply detecting the change amount, the change may be detected on the basis of the amount of the change ratio by, e.g., $$|df(t)/dt|=|(f(t)f(t-\Delta t))/\Delta t|>TH$$

The change is detected here simply on the basis of the time difference. However, the present embodiment is not limited to this. Information that changes every moment may be approximated by a spline curve. In this case, when the slope is larger than a predetermined slope, it is determined that the shape has changed. A more complex signal processing method may be used. In this embodiment, the acquisition method itself is not essential, and a detection method can be appropriately selected from various existing methods and used.

A case of using a single parameter value has been described. When a plurality of parameter values are used, the above determination is performed for each of the parameters, and the "presence" or "absence" of a change is detected on the basis of the weighted average of the parameters. Alternatively, each parameter value is regarded as a vector, and an arbitrary function prepared in advance for detection is applied to the vectors to detect a change.

The threshold value and detection method are preset in accordance with the control contents from the application switching control unit 104 (to be described later). A plurality of threshold values or detection methods may be prepared so that the user can select one of them as needed in the operation menu of the portable phone terminal. Alternatively, the user may input the threshold value.

With the above-described method, the shape change detection unit 103 can detect whether the upper case 201 and lower case 202 of, e.g., the folding type portable phone terminal have moved.

The detection need not always be executed in one step, as described above. A plurality of threshold values may be prepared, and a plurality of detection states may be output. More specifically, the change in the angle made by the upper case 201 and lower case 202 may be detected in several steps.

<Application Switching Control Unit 104 and Application Operation Unit 105>

The application switching control unit 104 transmits, to the application operation unit 105, a control signal for switching the application currently running on the terminal by using the information representing the "presence" or "absence" of the shape change detected by the shape change detection unit 103 and the moving parameter value acquired by the moving parameter acquisition unit 102, thereby switching the application currently running on the terminal.

Upon receiving the control contents from the application switching control unit 104, the application operation unit 105 switches the application to a predetermined application and runs the application.

More specifically, for example, when the shape change detection unit 103 detects a change in the shape of the terminal, the application switching control unit 104 decides the application to be activated in accordance with the current terminal state acquired from the application operation unit 105 and the moving parameter value acquired by the moving parameter acquisition unit 102, and sends a control signal for switching to the decided application to the application operation unit 105.

The current terminal state acquired from the application operation unit 105 indicates the information of the currently running application, if an event has occurred, information representing the type of the event and a process to be executed for the event, the state of input/output for the terminal, and the like. The application switching control unit 104 receives a necessary one of the current terminal states as needed and handles it as information for control.

Upon receiving the control signal from the application switching control unit 104, the application operation unit 105 switches the operation from the currently running application to the designated application.

The application operation method is not particularly limited. For, e.g., a multi-threaded application, the current application is deactivated. If the application to be activated is not started yet, it is started. If the application is already started, it is activated. For a pseudo multi-threaded application, the current application is ended after saving its state. The application to be activated is started while restoring its state at the time of end. The application switching need not always be performed using the whole screen. A window may overlap part of the window of an application, and another application may run in that window. The number of applications to be activated need not always be one, and a plurality of applications may run in the single screen.

The application operation unit 105 is normally implemented by a CPU or LSI and drives or controls various devices (not shown) such as a communication unit (not shown), memory (not shown), input and output units (not shown) such as a speaker and a microphone, and a camera and a GPS as needed, thereby implementing the menu operation, application execution, and speech communication of the portable phone terminal.

<Overall Operation>

The screen display processing apparatus in the above-described portable phone terminal or an equivalent portable information terminal can implement the following operation.

The folding type portable phone terminal is normally completely opened (in a state shown in FIG. 2) and used as shown in FIG. 4. Additionally, when mail has arrived when the user is browsing, e.g., a Web page, the normal portable phone terminal displays a notification representing the mail reception at part of the screen (display unit 106). A more thoughtfully designed model simultaneously displays the sender and title of the mail. This notification is typically displayed only for a predetermined time. When the predetermined time has elapsed, the notification disappears, and the display returns to the previous Web page browsing state. In some models, the icon of mail reception remains. This behavior varies depending on the model. In a conventional portable phone terminal, a user who wants to read received mail must press the mail button to end the Web browser application and activate the mail application. To restore the previous Web browsing state, the user needs to start the Web browser again and load the previous page, and this is cumbersome.

Normally, when the user is doing work (Web browsing using a Web browser) on the completely opened portable phone terminal as in the conventional case, and mail has arrived in this state, the user slightly rotates the upper case 201 of the portable phone terminal, as shown in FIG. 5. The shape change detection unit 103 detects this moving change. The application switching control unit 104 controls to switch the application to an application for displaying mail reception information. The application operation unit 105 executes the mail reception information display operation. While the user keeps this state, the mail reception information display operation continues so that the display unit 106 continuously displays the mail reception information.

When the upper case 201 of the portable phone terminal returns to the previous completely opened state, the shape change detection unit 103 detects the shape change again. The application switching control unit 104 controls to switch the application to the previous Web browser application. The application operation unit 105 switches the application to the previous Web browser state.

With the above operation, when the user is doing certain work (e.g., Web browsing in the above example), and an event (mail reception in the above example) has occurred in this state, the user slightly moves the case to switch the window to an application corresponding to the event so that he/she can quickly check the information of the event. When viewing of the information is ended, the user can quickly restore the previous work by returning (moving) the case to the previous state. That is, the user can easily check the information and quickly restore the previous state without touching a button (operation unit 107).

Figure 6:
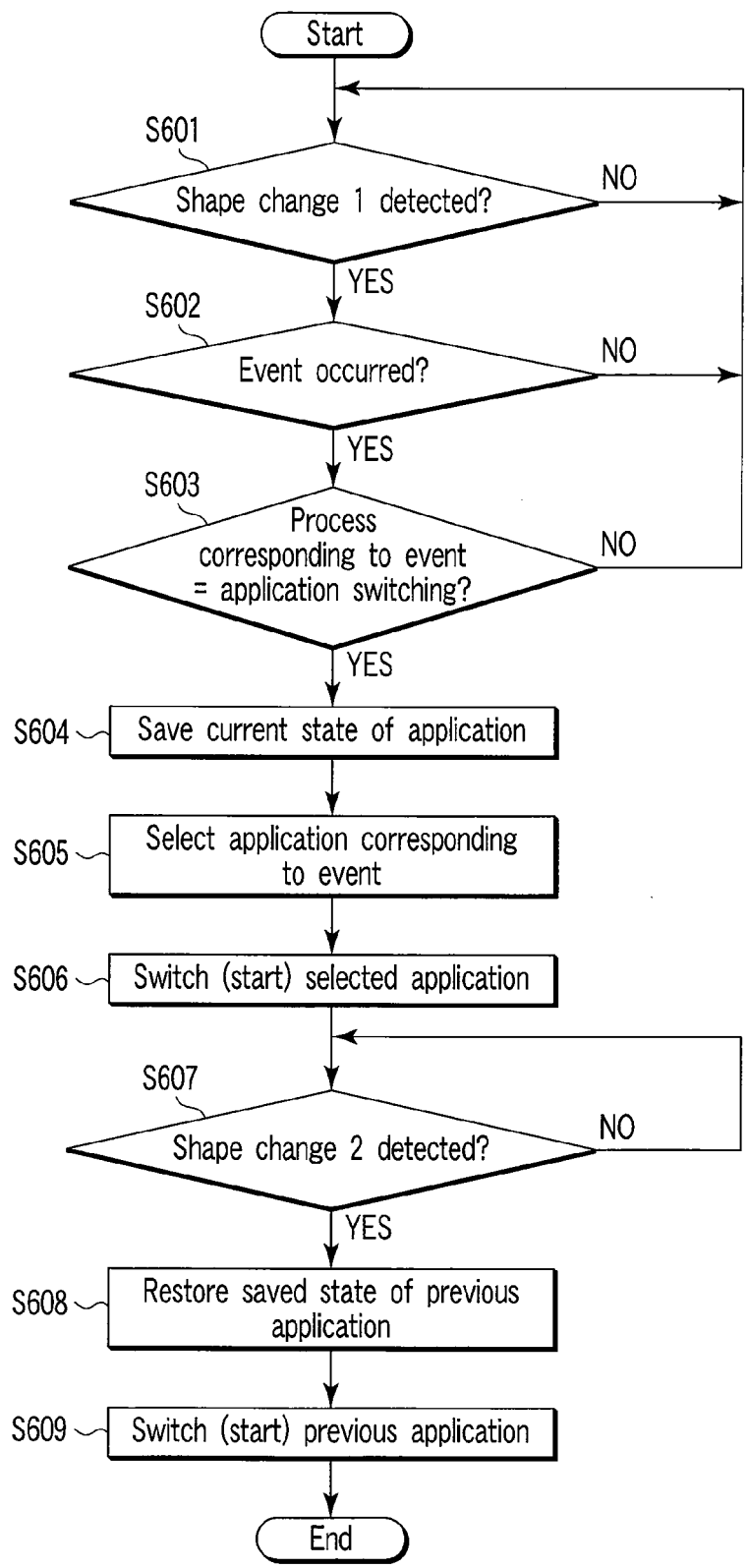
FIG. 6 is a flowchart illustrating an example of the operation of the screen display processing apparatus in FIG. 1.

An example of the operation of the screen display processing apparatus in FIG. 1 will be described next with reference to FIG. 6.

First, the shape change detection unit 103 detects whether shape change 1 has occurred (step S601). In the above example, shape change 1 indicates a shape change from the state in which the upper case 201 and lower case 202 are completely opened to the state in which they are closed to a predetermined angle θ (or θ or more). The angle θ is acquired by the moving parameter acquisition unit 102. The shape change detection unit 103 detects whether shape change 1 has occurred.

If it is determined in step S601 that shape change 1 has occurred, it is determined next whether an event has occurred (step S602). In the above example, mail reception has occurred as an event. Normally, the OS (Operating System) or an equivalent system management program is notified of it by an interrupt signal. The management, control, and operation are normally executed by the application operation unit 105 but may be done by another constituent element (not shown) of the portable phone terminal. If it is determined in step S602 that no event has occurred, the process returns to step S601.

The application switching control unit 104 determines whether the process corresponding to the event is application switching (step S603). Whether the process corresponding to the event is application switching is recorded in advance in a database (not shown) held by the application switching control unit 104. The application switching control unit 104 executes the determination by collation with the database. If it is determined that the process is application switching, the process advances to step S604. Otherwise, the process returns to step S601.

The application switching control unit 104 saves the state of the current application as preparation for application switching (step S604). A case will be described herein in which the application switching method of the portable phone terminal is pseudo multitasking. In the above example, the application switching control unit 104 saves the information (e.g., URL or browsing position) of a Web page the user is currently browsing on the Web browser. Next, the application switching control unit 104 selects the application to be activated in correspondence with the event (step S605). In the above example, an application for notifying the user of the mail sender or mail title is selected. Switching to the selected application is done (step S606). In the above example, the application (mail reception notification application) for notifying the user of the mail sender or mail title is started.

The shape change detection unit 103 detects whether shape change 2 has occurred (step S607). If shape change 2 is detected in step S607, the process advances to step S608. Otherwise, the process returns to step S607. Shape change 2 is a shape change reverse to shape change 1. In the above example, shape change 2 indicates a shape change from the state in which the upper case 201 and lower case 202 are opened by the angle θ (or θ or more) to a state in which the upper case 201 and lower case 202 are completely opened.

That is, when shape change 2 occurs after shape change 1, the state returns to the previous shape before shape change 1. Next, the saved previous application state is restored (step S608). The window is switched to the previous application, and the process is ended (step S609). In the above example, the state (e.g., URL that was being opened or the browsing position) of the Web browser before the start of the mail reception notification application is restored, and the Web browser is started. This implements an operation of switching the window to the mail reception application to make the user check the reception information only when the upper case 201 is moved by θ and restoring the application that was previously running when the upper case 201 is returned to the previous state.

According to the above-described first embodiment, when an event has occurred during execution of an application, the user can easily view the information obtained by the event without operating the operation unit 107 merely by slightly moving the moving part of the portable phone terminal. The user can also quickly restore the previous application operation merely by returning the moving part of the portable phone terminal to the previous state.

A mail reception notification application has been exemplified above. However, the embodiment is not limited to this. When the application is switched in accordance with the occurrence of shape change 1, the portable phone terminal may be operable by using the operation unit 107. For example, the mail reception notification application may display the mail text so that the user can scroll and read it by using the direction keys.

A portable phone terminal having a rotating mechanism has been exemplified above. However, the present embodiment is not limited to this. The same operation can be implemented in accordance with the moving method of the moving mechanism.

An operation of switching the application in accordance with the shape change when a predetermined event has occurred has been described above. However, the present embodiment is not limited to this. The application to be switched need not always be synchronized with the event. For example, the application may be switched to a calendar display application when the shape change is detected. In this case, when a user wants to check the calendar during execution of an application, he/she can do so merely by slightly moving the moving part of the portable phone terminal. This also applies to other applications.

The above-described operation can typically be changed by causing the user to select, as needed, one of operations defined in advance in the terminal using, e.g., a menu. For example, the user can select a threshold value to be used for shape change detection, the contents of the application to be activated, or the contents of the shape change to be used for switching. The operations can also be acquired from the outside of the terminal by accessing the Internet using the communication function of the terminal. This is almost the same as in the current portable phone which can acquire a ringer tone or the GUI (Graphical User Interface) of a menu from the outside and change it.

First Modification of First Embodiment

In the above-described first embodiment, when a predetermined moving change is detected, the application switches. When a change reverse to the predetermined moving change is detected, the application returns to the previous application. However, the present embodiment is not limited to this. Arbitrary application switching may be done in accordance with an arbitrary shape change.

Figure 7:
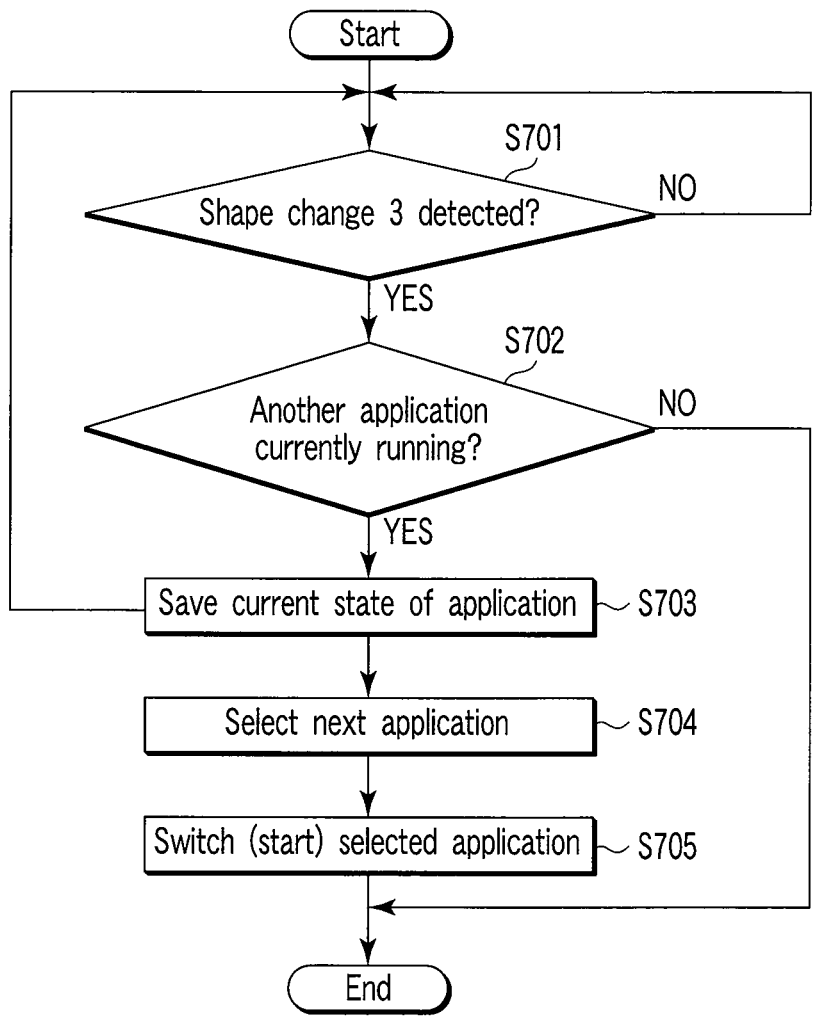
FIG. 7 is a flowchart illustrating an example of the operation of the screen display processing apparatus according to the first modification of the first embodiment.

For example, an operation shown in FIG. 7 is possible.

First, the application switching control unit 104 detects whether shape change 3 has occurred (step S701). If shape change 3 is detected, the process advances to step S702. Otherwise, the process returns to step S701. As shape change 3 in step S701, for example, a series of states in which the upper case 201 and lower case 202 are completely opened, then closed to the predetermined angle θ (or θ or more), and then completely opened again is used.

The application switching control unit 104 determines whether another application is currently running or currently being saved (step S702). If another application exists, the process advances to step S703. Otherwise, the process is ended. The application switching control unit 104 saves the state of the current application (step S703) and selects the next application (step S704). The next application can be decided by any method, and for example, applications which are currently started are managed by a queue or FIFO in the order of use, and the next application to be activated is decided. The application switching control unit 104 switches the application to the selected one (step S705).

The above arrangement enables to, e.g., use the shape change using the moving mechanism of the portable phone for task switching. For example, assume that three applications: mail application, Web browser, and schedule application are running, and the mail application is currently active. At this time, the user can successively switch the active application to the Web browser, schedule application, etc. by slightly moving a moving part of the portable phone. In Microsoft Windows®, a user can switch the current active task by successively pressing the "Tab" key while pressing the "Alt" key. The operation of this modification is similar to this.

Second Modification of First Embodiment

In the above-described first embodiment, the application switches to a single application folding type portable phone terminal upon a predetermined single shape change. However, the present embodiment is not limited to this. For example, when the angle made by the upper case 201 and lower case 202 changes by an angle θ1 or more, switching to application 1 occurs. When the angle changes by θ2 (θ2>θ1) or more, switching to application 2 occurs. That is, the application to be activated may change in accordance with the shape change amount.

Third Modification of First Embodiment

For example, when the angle made by the upper case 201 and lower case 202 changes by the angle θ1 or more, switching to mode 1 of an application occurs. When the angle changes by θ2 (θ2>θ1) or more, switching to mode 1 of the same application occurs. That is, the execution state of the activated application may change in accordance with the shape change amount.

For example, a plurality of modes are prepared in a mail reception notification application. In mode 1, only sender information is displayed. In mode 2, not only the sender information but also the mail title is displayed. In mode 3, the mail text is also displayed in addition to the information displayed in mode 2. When the angle made by the upper case 201 and lower case 202 changes by the angle θ1 or more, switching to the mail reception notification application occurs, and only the sender information is displayed. When the angle changes by θ2 (θ2>θ1) or more, not only the sender information but also the mail title is displayed. Such an operation can be implemented. It is therefore possible to control information to be obtained by changing the mode of the activated application in accordance with the moving amount of the moving part of the portable phone terminal.

Figure 8A:
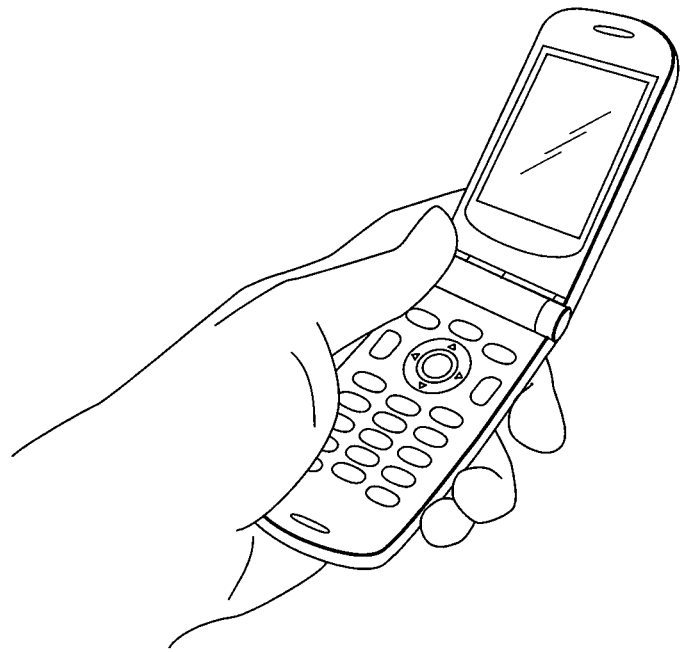
FIGS. 8A and 8B are views for explaining a difference in screen visibility according to a shape change caused by moving a moving part of the folding type portable phone terminal.

This usage is effective when the user does not want the people around him/her to see private information. An example of screen visibility (FIG. 8A) when the portable phone is largely opened (the angle made by the upper case 201 and lower case 202 is large) and an example of screen visibility (FIG. 8B) when the portable phone is opened only slightly (the angle made by the upper case 201 and lower case 202 is small) are shown. In the example in FIG. 8A, the people around the user can clearly see the screen. In the example in FIG. 8B, the contents of the screen cannot be seen.

Using this relationship to advantage, when the portable phone is slightly closed, application switching occurs, and only the presence/absence of mail reception is displayed. When the portable phone is opened only slightly, the sender, mail title, and text are displayed. That is, the information to be displayed on the screen can be changed in accordance with the amount by which the portable phone is opened (closed). If people are present in the vicinity, and the user does not want them to see mail contents, he/she can see information such as the sender, mail title, and text in secret by opening the portable phone only slightly, as in FIG. 8B.

As described above, it is possible to sensuously control the amount of information to be displayed on the screen depending on the moving amount of the moving part of the portable phone.

Fourth Modification of First Embodiment

Figure 9:
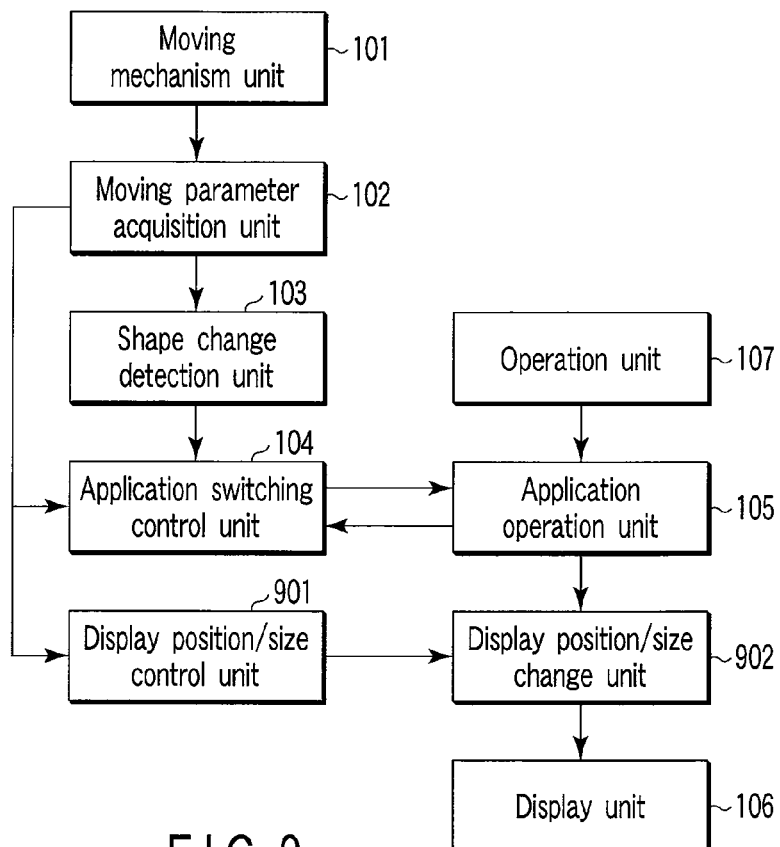
FIG. 9 is a block diagram of a screen display processing apparatus according to the fourth modification of the first embodiment.

A screen display processing apparatus according to the fourth modification of the first embodiment will be described with reference to FIG. 9.

The screen display processing apparatus of this modification is formed by adding a display position/size control unit 901 and a display position/size change unit 902 to the screen display processing apparatus of the first embodiment.

The display position/size control unit 901 controls the screen display position and size of an application on the basis of the parameter amount acquired by the moving parameter acquisition unit 102.

The display position/size change unit 902 changes the screen display position and size of an application in accordance with the control contents from the display position/size control unit 901.

<Display Position/Size Control Unit 901 and Display Position/Size Change Unit 902>

More specifically, in accordance with the parameter amount acquired by the moving parameter acquisition unit 102, the display position/size control unit 901 controls the screen display position and size of a running application that is switched by the application switching control unit 104 and application operation unit 105.

Figure 10A:
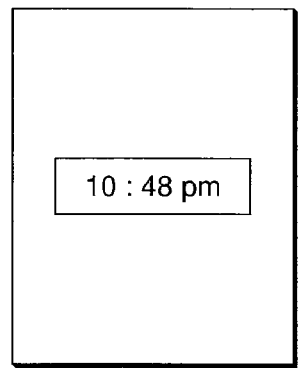
FIGS. 10A and 10B are views showing an example of the result of display position and size control executed by the screen display processing apparatus in FIG. 9.

Assume that during execution of an application, switching to a timepiece application for displaying the time superimposed on part of the screen is caused by a shape change of the moving part of the portable phone terminal. FIG. 10A shows this state. The display of the timepiece application is superimposed at the center of the screen by a shape change. The display in FIG. 10A is hard to see when the portable phone is opened only slightly, as in FIG. 8B. This modification is made in consideration of this situation and enables to control the screen display position and size of an application in accordance with the parameter amount acquired by the moving parameter acquisition unit 102.

Figure 10B:
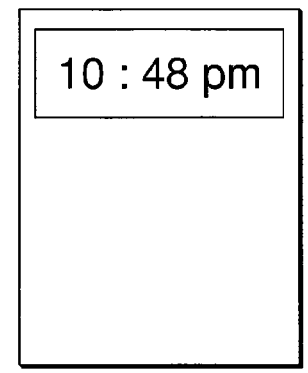

More specifically, for example, when the angle made by the upper case 201 and lower case 202 is small, the display position is proportionally shifted, and the display size is also increased proportionally, as shown in FIG. 10B. Letting θ be the moving parameter, the display size and display position can be expressed by functions f(θ) and g(θ), respectively. The functions f and g are defined in advance and stored in a database (not shown) to be referred to by the display position/size control unit 901. The display position/size control unit 901 acquires the functions f and g by referring to the database and calculates the size and position from the functions and parameter amount. The contents of the functions can be changed as needed in accordance with the use scene, and any function is usable. In the above-described example, the moving parameter is one-dimensional. Generally, it is represented by an n-dimensional vector. The size and position are calculated by inputting the n-dimensional vector to the functions f and g.

The above arrangement enables to change the display position and size as needed in accordance with the degree of the shape change of the portable phone terminal. It is therefore possible to provide a high visibility display even in the case of a shape change.

Fifth Modification of First Embodiment

A screen display processing apparatus according to the fifth modification of the first embodiment will be described with reference to FIGS. 11 to 14.

The screen display processing apparatus of this modification is formed by adding a display switching unit 1101, first display unit 1102, and second display unit 1103 to the screen display processing apparatus of the first embodiment.

The display switching unit 1101 switches the display unit for displaying the operation result and state of the application operation unit 105 or an application window to the first display unit 1102 or second display unit 1103.

<First Display Unit 1102 and Second Display Unit 1103>

Many recent portable phone terminals have two or more display units. In the first embodiment, the display unit 106 is not particularly defined as a specific display unit of a portable phone. That is, the embodiment can be practiced similarly regardless of selection of the display unit.

In this modification, the display units are distinguished. FIGS. 12A and 12B show an example of the portable phone terminal. Recent folding type portable phone terminals have a relatively large screen (FPD), called a main screen, and a sub screen (also called a rear screen) arranged on the outer side of the portable phone terminal (normally on the reverse side of the main screen). The first display unit 1102 is, e.g., the main screen, and the second display unit 1103 is, e.g., the sub screen.

An example in which the first display unit 1102 is the main screen, and the second display unit 1103 is the sub screen has been described. However, the present embodiment is not limited to this. If three or more screens exist, two of them are selected as the first display unit 1102 and second display unit 1103. Note that the function of the first display unit 1102 and shape change detection unit 103 is the same as the display unit 106 described in the first embodiment.

<Display Switching Unit 1101>

The display switching unit 1101 switches the display screen of the application operation unit 105 between the first display unit 1102 and the second display unit 1103. The parameter amount acquired by the moving parameter acquisition unit 102 and/or the shape change result detected by the shape change detection unit 103 is used as data to determine switching.

The difference in screen visibility depending on the angle made by the upper case and lower case of the folding type portable phone terminal will be described next with reference to FIGS. 13A and 13B.

Figure 13A:
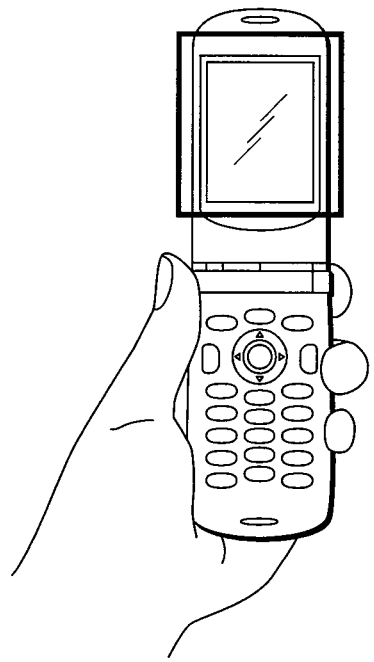
FIGS. 13A and 13B are views for explaining a difference in screen visibility of the main screen and sub screen according to a shape change caused by moving a moving part of the folding type portable phone terminal.
Figure 13B:

FIG. 13A shows the portable phone terminal whose cases make a large angle. The first display unit 1102 is visible, and the second display unit 1103 is invisible. On the other hand, FIG. 13B shows the portable phone terminal whose cases make a small angle. Conversely, the second display unit 1103 is visible, and the first display unit 1102 is invisible. In this example, display contents can always be displayed on a visible display unit by switching the display unit between the first display unit 1102 and the second display unit 1103 as needed in accordance with the angle made by the upper case and lower case.

More specifically, in this example, the selection target is decided depending on the angle θ so that, for example, if θ>TH, then select the first display unit, else select the second display unit. TH is the threshold value for switching. The switching target calculation method is merely an example. The switching target is calculated using an optimum calculation method as needed on the basis of, e.g., the shape of the portable phone terminal and the structure of the moving mechanism.

The above arrangement allows the user to select a screen offering higher visibility, in addition to the effect of the first embodiment.

<Display Contents Change Unit>

The first display unit 1102 and second display unit 1103 may have different display performances. When the first display unit 1102 is the main screen, and the second display unit 1103 is the sub screen, the main screen normally has a large size, represented by inches, and a high resolution. The sub screen often has a smaller size, represented by inches, and a lower resolution. The reaction speed of the sub screen is also often low.

In this case, a display contents change unit 1401 is further added to the screen display processing apparatus in FIG. 11, as shown in FIG. 14. The above problem can be solved by changing the display contents in accordance with the performance difference between the first display unit 1102 and the second display unit 1103 and displaying the changed display contents on the second display unit 1103.

More specifically, for example, when the second display unit 1103 has a lower resolution, the display contents change unit 1401 changes the screen display contents of the application operation unit 105 so that only part of the contents is displayed. The display contents change unit 1401 also changes the display layout or display character size. The change contents are not limited to these, and various means are usable.

Sixth Modification of First Embodiment

Figure 15:
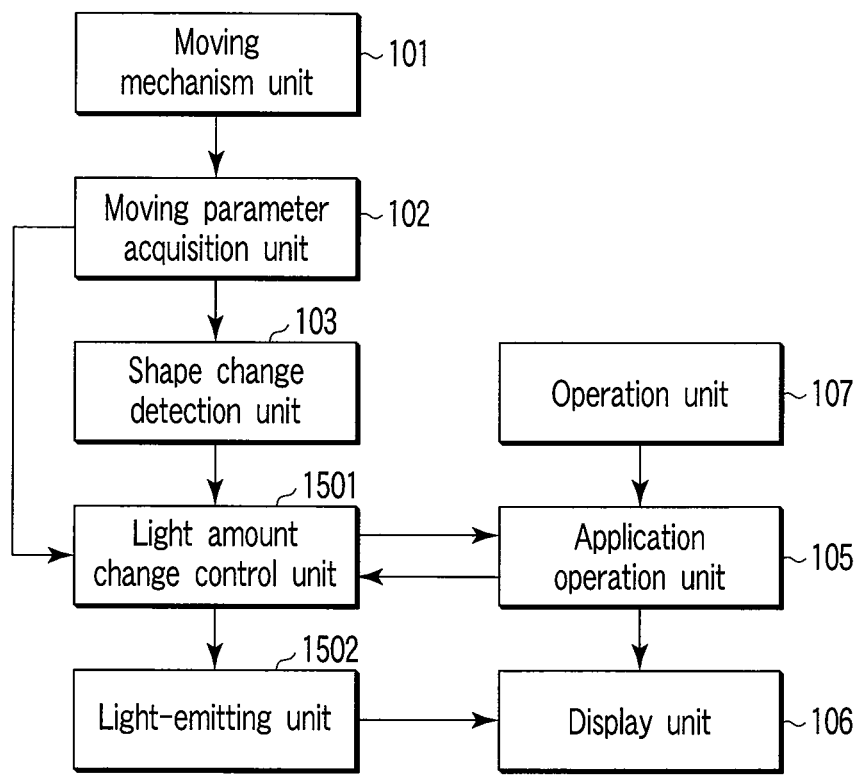
FIG. 15 is a block diagram of a screen display processing apparatus according to the sixth modification of the first embodiment.

A screen display processing apparatus according to the sixth modification of the first embodiment will be described with reference to FIG. 15.

This modification is different from the first embodiment in that the application switching control unit 104 changes to a light amount change control unit 1501, and a light-emitting unit 1502 is added.

<Light-Emitting Unit 1502>

The light-emitting unit 1502 changes the display light amount (display brightness) of the display unit 106 and includes a so-called backlight. The light-emitting amount can be changed in several steps. The light-emitting amount of the light-emitting unit 1502 decides the display brightness of the display unit 106.

<Light Amount Change Control Unit 1501>

The light amount change control unit 1501 controls the functions of the portable phone terminal by using information representing the presence/absence of a shape change detected by the shape change detection unit 103 and the moving parameter value acquired by the moving parameter acquisition unit 102. In this embodiment, the light amount change control unit 1501 decides the light-emitting amount of the light-emitting unit 1502.

The light amount change control unit 1501 also controls the color scheme, contrast, and display size of an application operation window by using information representing the presence/absence of a shape change detected by the shape change detection unit 103 and the moving parameter value acquired by the moving parameter acquisition unit 102. Upon receiving the control contents from the light amount change control unit 1501, the application operation unit 105 changes the color scheme, contrast, and display size of an application operation window and outputs the window to the display unit 106.

<Overall Operation>

As described above, the screen display processing apparatus according to the sixth modification can change the light-emitting amount of the light-emitting unit 1502 in accordance with the shape change of the moving mechanism of the portable phone terminal. This consequently leads to change of the light-emitting amount of the display unit 106. The display can be made to have higher visibility in accordance with the light amount of the environment by changing the light-emitting amount.

It is also possible to change the color scheme, contrast, and display size of an application display window displayed on the display unit 106 in accordance with the shape change of the moving mechanism of the terminal. The display can be made to have higher visibility in a dark place or bright place by changing the color scheme and contrast. In this embodiment, the method of changing the color scheme or contrast is not particularly limited, and various existing methods are usable. The visibility in a dark place can also be changed by changing the display size of an application display window.

Figure 16A:
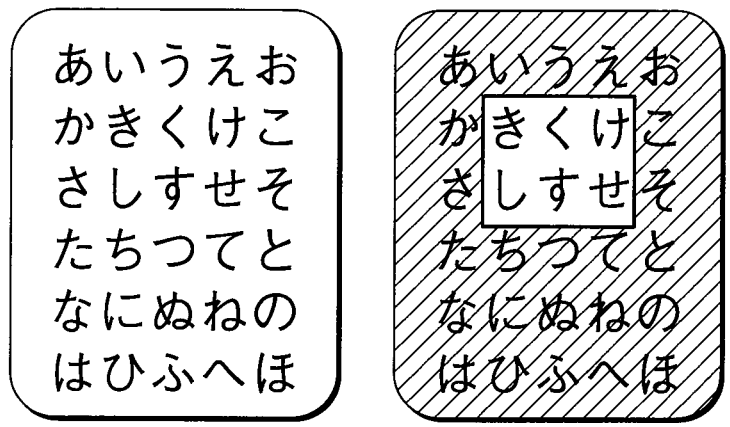
FIGS. 16A and 16B are views for explaining an example of display when the size of the display area on the screen is changed.
Figure 16B:

FIG. 16A shows an example in which the display area size is reduced without changing the character size. FIG. 16B shows an example in which the display area size is reduced, and the character size is changed, too. In both cases, when the display area size is changed, and a portion outside the display area is defined as an non-rendered area (e.g., an area rendered by black), the bright portion becomes small as a whole, and the average brightness of the entire screen lowers. This makes the display easily visible even in a dark place. Each of the above-described arrangements is merely an example and can be combined with various methods.

As described above, a high visibility display can be obtained in accordance with the ambient light amount by changing the light-emitting amount of the light-emitting unit 1502 or by changing the color scheme, contrast, and display size of an application display window displayed on the display unit 106. The effect can be enhanced by using both methods simultaneously.

Assume a situation in which the user uses the portable phone in a dark place. For example, assume that mail has arrived at the portable phone when the user is seeing a movie in, e.g., a movie theater. The user is going to unfold the portable phone and check the mail. Normally, the moment the user unfolds the portable phone, the light-emitting unit 1502 emits light to brightly display contents on the display unit 106. In the dark, this operation causes leakage of a large amount of light to the vicinity, and the brightness of the light annoys people around the user. Especially in a place such as a movie theater, if a user does this, this light leakage causes extreme annoyance for other people.

The sixth modification of the first embodiment aims at solving this problem and provides an environment in which the user can see necessary information while minimizing light leakage to the vicinity by simultaneously changing the light-emitting amount of the light-emitting unit 1502 and the color scheme, contrast, and display size of an application display window displayed on the display unit 106 in accordance with the shape change of the moving mechanism of the terminal.

More specifically, for example, the light amount is increased in proportion to the angle θ made by the upper case 201 and lower case 202. When the angle θ is small, the light amount is reduced. When the angle θ is large, the light amount is increased. When the upper case 201 and lower case 202 are completely opened, the light amount is maximized. The light amount can be linearly increased in proportion to the angle θ or by any other method.

Figure 8B:

With this arrangement, when the portable phone is opened slightly, as shown in FIG. 8B, the light-emitting unit 1502 emits a small amount of light, and the display on the display unit 106 becomes dark. As described in the third modification of the first embodiment, when the portable phone is opened slightly, the screen is not easy to see from the periphery (refer to the description of FIG. 8B), and light leakage is small. This effect can be enhanced by simultaneously executing control to decrease the light-emitting amount. The present inventors call this function of suppressing the light amount and preventing any trouble caused by light leakage in the dark "light amount manner mode". This embodiment is suitable to implement the light amount manner mode.

In the above-described example, the light amount is increased in proportion to the angle θ. However, the present embodiment is not limited to this. The light amount may be increased in inverse proportion to the angle θ or may be changed in other forms.

The effect can further be enhanced by simultaneously applying display size change as shown in FIG. 16A or 16B or contrast change in accordance with the angle θ.

Seventh Modification of First Embodiment

Figure 17:
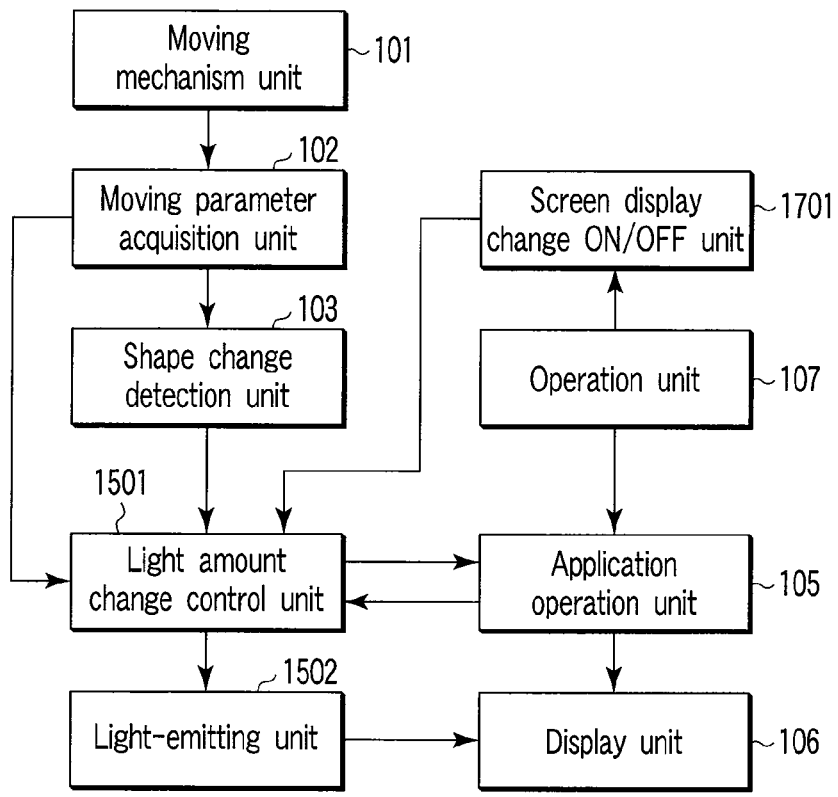
FIG. 17 is a block diagram of a screen display processing apparatus according to the seventh modification of the first embodiment.

A screen display processing apparatus according to the seventh modification of the first embodiment will be described with reference to FIG. 17.

The screen display processing apparatus of this modification is formed by adding a screen display change ON/OFF unit 1701 to the screen display processing apparatus of the sixth modification of the first embodiment.

The screen display change ON/OFF unit 1701 switches between a mode (ON) in which the process of changing the light-emitting amount of the light-emitting unit 1502 or the color scheme, contrast, and display size of an application display window displayed on the display unit 106 in accordance with the shape change by the moving mechanism of the screen display processing apparatus according to the sixth modification of the first embodiment is executed and a mode (OFF) in which the process is not executed.

An existing button of the operation unit 107 or a newly added button implements the screen display change ON/OFF unit 1701. For example, ON and OFF are successively switched by pressing the button.

When the above-described "light amount manner mode" is implemented, an existing manner mode button of the operation unit 107 is preferably used as the screen display change ON/OFF unit 1701. The manner mode button already has various modes. The function of the screen display processing apparatus according to the sixth modification of the first embodiment is assigned as one of the modes and handled by the manner mode button like the remaining modes. In this case, the light amount manner mode function is handled as one of the manner modes. The light amount manner mode is turned on or off in a menu displayed when the manner mode button is pressed. Alternatively, several manner modes are input as a set (including the light amount manner mode function) and turned on or off at once by pressing the manner mode button.

Second Embodiment

<Overall Arrangement>

Figure 18:
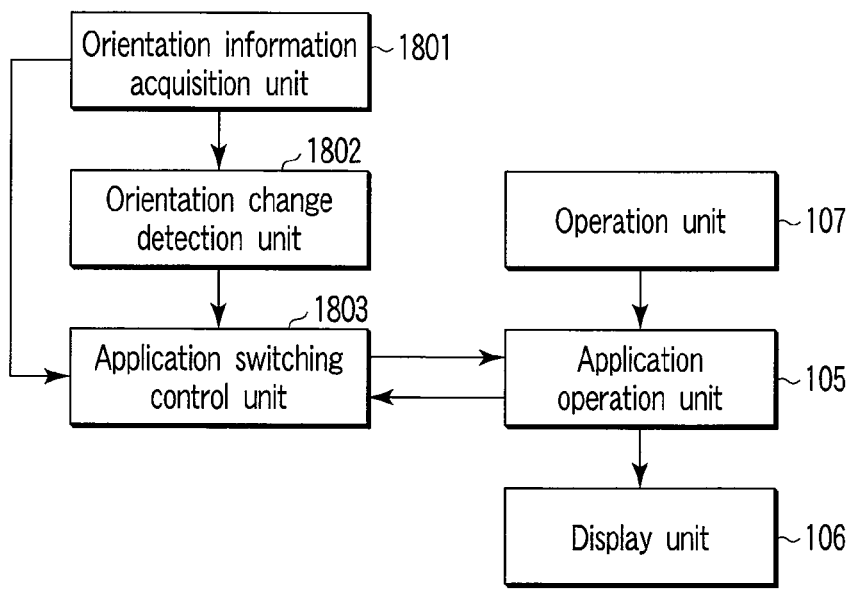
FIG. 18 is a block diagram of a screen display processing apparatus according to the second embodiment.

A screen display processing apparatus according to the second embodiment will be described with reference to FIG. 18.

The screen display processing apparatus of this embodiment includes an orientation information acquisition unit 1801, orientation change detection unit 1802, application switching control unit 1803, operation unit 107, application operation unit 105, and display unit 106.

The orientation information acquisition unit 1801 acquires the orientation of at least one of cases included in a terminal.

The orientation change detection unit 1802 detects a change in the orientation of the terminal on the basis of at least one piece of orientation information acquired by the orientation information acquisition unit 1801.

The application switching control unit 1803 controls to switch the application running on the terminal by using information representing "presence" or "absence" of an orientation change detected by the orientation change detection unit 1802 and the orientation information acquired by the orientation information acquisition unit 1801.

<Orientation information Acquisition Unit 1801>

More specifically, the orientation information acquisition unit 1801 installs at least one orientation sensor on at least one of the cases included in the terminal and acquires the orientation information of the terminal by using the sensor. The orientation sensor is implemented by at least one of a tilt sensor, acceleration sensor, angular velocity sensor (gyroscope sensor), magnetic sensor, and the like. These sensors are merely examples, and the orientation sensor may use any other means.

The sensor attachment positions, the number of attached sensors, and the attachment directions on the terminal are known. Using these pieces of information and the information from the sensors, the current orientation information of the terminal can be obtained.

Each orientation sensor can individually output orientation information. The orientation sensors may be divided into several groups so that each group calculates orientation information using certain functions and outputs it. Alternatively, total orientation information may be calculated by using certain functions. The functions are defined in advance in consideration of the sensor attachment positions, the number of attached sensors, and the attachment directions on the terminal.

<Orientation Change Detection Unit 1802>

The orientation change detection unit 1802 detects a change in the orientation of the terminal. The orientation change detection method used herein is almost the same as in the above-described first embodiment of the present embodiment. The orientation change detection unit 1802 determines, on the basis of the orientation information representing the orientation of at least one of the cases included in the portable terminal apparatus, whether the orientation has changed. For example, assume that information from a triaxial orientation sensor is acquired from the orientation information acquisition unit 1801. This information is represented by v=(vx,vy,vz) where v is the vector amount. Reference orientation information is represented by v0=(vx0,vy0,vz0). When the magnitude of the difference is $$\|v-v0\|>TH$$

the orientation is assumed to have changed. TH is a predetermined threshold value, and $\|\cdot\|$ is the L2 norm. This enables to detect an orientation change from the reference orientation. The above-described detection method is merely an example, and the present embodiment is not limited to this. Various methods described above in the first embodiment can also be used, and any method other than those described may be used.

<Application Switching Control Unit 1803>

The application switching control unit 1803 controls to switch the application running on the terminal by using the information representing "presence" or "absence" of an orientation change detected by the orientation change detection unit 1802 and the orientation information acquired by the orientation information acquisition unit 1801.

The operation of the application switching control unit 1803 is almost the same as in the above-described first embodiment. The description of the application switching control unit 104 can be applied to the application switching control unit 1803 by changing a shape change detection result to an orientation change detection result and moving parameter information to orientation information.

<Overall Operation>

In the above-described first embodiment, the application can be switched by using the shape change of the portable phone terminal. In the second embodiment, the same effect as in the first embodiment can be achieved by using the orientation change of the portable phone terminal.

First Modification of Second Embodiment

The second embodiment can employ the same modifications as in the first to seventh modifications of the first embodiment. The same effect as described above can be obtained by replacing a shape change in the modifications of the first embodiment with an orientation change.

Third Embodiment

<Overall Arrangement>

A screen display processing apparatus according to the third embodiment will be described with reference to FIG. 19.

The screen display processing apparatus of this embodiment includes an orientation information acquisition unit 1801, orientation change detection unit 1802, screen viewing direction estimation unit 1901, display information conversion control unit 1902, display information conversion unit 1903, and display unit 106.

The screen viewing direction estimation unit 1901 estimates the terminal user's terminal screen viewing direction on the basis of at least one piece of orientation information acquired by the orientation information acquisition unit 1801.

The display information conversion control unit 1902 controls to convert display information on the terminal by using information representing "presence" or "absence" of an orientation change detected by the orientation change detection unit 1802, the orientation information acquired by the orientation information acquisition unit 1801, and the screen viewing direction information estimated by the screen viewing direction estimation unit 1901.

The display information conversion unit 1903 converts the display information on the terminal in accordance with the control contents of the display information conversion control unit 1902.

<Screen Viewing Direction Estimation Unit 1901>

The screen viewing direction estimation unit 1901 can detect the orientation of the terminal by using at least one piece of orientation information acquired by the orientation information acquisition unit 1801 and known information such as the sensor attachment positions, the number of attached sensors, and the attachment directions on the terminal, as described above. The screen viewing direction estimation unit 1901 calculates the orientation information of the display unit 106 by using the detected orientation information and known information of the positional relationship between the orientation sensors and the display unit 106.

Using these pieces of information and based on an assumption that the terminal user normally views the screen while facing the screen with the head vertical (when the user is standing or sitting in a chair), the screen viewing direction estimation unit 1901 estimates the direction in which the user views the screen of the display unit 106. This will be described with reference to FIGS. 20A to 20C. FIG. 20A shows an example in which the user views the terminal in a normal direction. Assume that the orientation of the display unit 106 is detected to be, e.g., upright (an orientation in which the angle made by the screen and the vertical direction is 0°). On the basis of this orientation and the above assumption (the user is in the state shown in FIG. 20A), the screen viewing direction estimation unit 1901 estimates that the user is viewing the screen in an upright state (the angle made by the screen and the vertical direction is 0°). Similarly, in FIG. 20B, the screen viewing direction estimation unit 1901 estimates that the user is viewing the terminal in an inverted state (an orientation in which the angle made by the screen and the vertical direction is 180°). In FIG. 20C, the screen viewing direction estimation unit 1901 estimates that the user is viewing the terminal in a laid-down state and, more specifically, in a rightward laid-down state (an orientation in which the angle made by the screen and the vertical direction is 90°). Similar estimation can be done for an arbitrary orientation.

The above-described estimation method based on orientation information is merely an example, and the present embodiment is not limited to this. The screen viewing direction can be estimated using arbitrary orientation information. Any assumption other than that described above can be used. Alternatively, several assumptions may be prepared in advance so that the assumption is changed by causing the user to select one of them.

<Display Information Conversion Control Unit 1902>

More specifically, when the orientation change detection unit 1802 detects an orientation change, the display information conversion control unit 1902 controls to execute conversion in accordance with the user's screen viewing direction such that the display contents are always directed in, e.g., the normal direction (upright) by using the orientation information acquired by the orientation information acquisition unit

1801 and the screen viewing direction information estimated by the screen viewing direction estimation unit 1901. FIGS. 21A to 21C show this state. As shown in FIGS. 21A to 21C, the display direction is fixed in the conventional portable phone terminal, and displayed information is difficult to see if the user does not view the portable phone terminal in a correct direction (direction in FIG. 21A) (see the conventional display examples on the right side of FIGS. 21A to 21C). When display information is converted in accordance with the user's screen viewing direction such that the display contents are always directed in the normal direction (upright), the user can view the display information always directed in the same direction independently of the terminal screen viewing direction (see the display examples of the present embodiment in the middle of FIGS. 21A to 21C). At this time, on the basis of information estimated by the screen viewing direction estimation unit 1901 and representing that the screen viewing direction is θ°, the display information conversion control unit 1902 sends, to the display information conversion unit 1903, a control signal to rotate the characters to be displayed on the screen by −θ.

<Display Information Conversion Unit 1903>

More specifically, the display information conversion unit 1903 executes, e.g., rotational conversion of the display contents in accordance with a display contents rotational conversion instruction received from the display information conversion control unit 1902 and outputs the display contents to the display unit 106. This implements the display as shown in FIGS. 21A to 21C.

The display information conversion control unit 1902 and display information conversion unit 1903 have been described above by exemplifying rotational conversion. However, the present embodiment is not limited to this, and any type of conversion control can be done.

<Overall Operation>

In the above-described third embodiment, the display contents on the screen can be changed in accordance with the orientation and/or orientation change of the portable phone terminal. This allows the user to view the display information without caring about the orientation of the portable phone terminal.

A situation will be described below in which the user takes out the portable phone from a bag and checks the time. Recently, many people use the portable phone in place of a watch and do not carry any other watch. In this case, the user mostly holds the portable phone in a bag and, to use it, reaches the hand and fumbles in the bag for the portable phone without particular attention, and grasps and takes it out of the bag without seeing the portable phone. The portable phone taken out is often oriented in various directions. Even when the user visually checks in the bag and takes out the portable phone, the portable phone is not always oriented in a specific direction. Hence, when the user grasps the portable phone and takes it out of the bag, the portable phone is oriented in various directions, as in the above case.

FIGS. 22A, 22B, and 22C illustrate states in which the user takes out the portable phone in the upright state, inverted state, and laid-down state, respectively. The above description also applies to a case in which the user takes the portable phone out of a trouser pocket. That is, when the user takes the portable phone out of somewhere, its orientation when taken out by the user changes depending on the orientation when stored. If the user checks the time displayed on the screen in this state, the displayed characters are hard to see because the screen viewing direction varies. This has been described with reference to FIGS. 21A to 21C. Normally, the user directs the portable phone in a direction to easily view the screen (to be referred to as a correct direction hereinafter), i.e., in the direction shown in FIG. 22A and views the screen (FIGS. 22D and 22E). This is because the screen display of the portable phone is normally designed to enable the user to correctly read information on the screen in the state shown in FIG. 22A (the state in which the portable phone is held in the correct direction).

That is, when the user wants to use the portable phone in this state, conventionally, he/she takes it out of, e.g., a bag, orients the portable phone in the correct direction, and then uses it. However, this is too cumbersome to meet the simple requirement, i.e., of simply checking the time, and access to information (time in this example) is time-consuming. This problem is solved when the user can access information easy to see, i.e., information always displayed in the upright state as shown in FIGS. 21A to 21C without changing the orientation of the portable phone terminal that has been taken out. It is more effective if the user need not have to remove the portable phone from the bag. That is, the user can quickly check the time merely by fumbling in the bag for the portable phone and viewing the screen.

The above-described use method is merely an example. The effect of changing the display contents on the screen in accordance with the orientation and/or orientation change of the portable phone terminal and allowing the user to view the display information without caring about the orientation of the portable phone terminal is very large.

The orientation and the viewing direction have been described above as one-dimensional for descriptive convenience. However, the present embodiment is not limited to this. The number of dimensions may be two, three, or more.

Figure 23A:
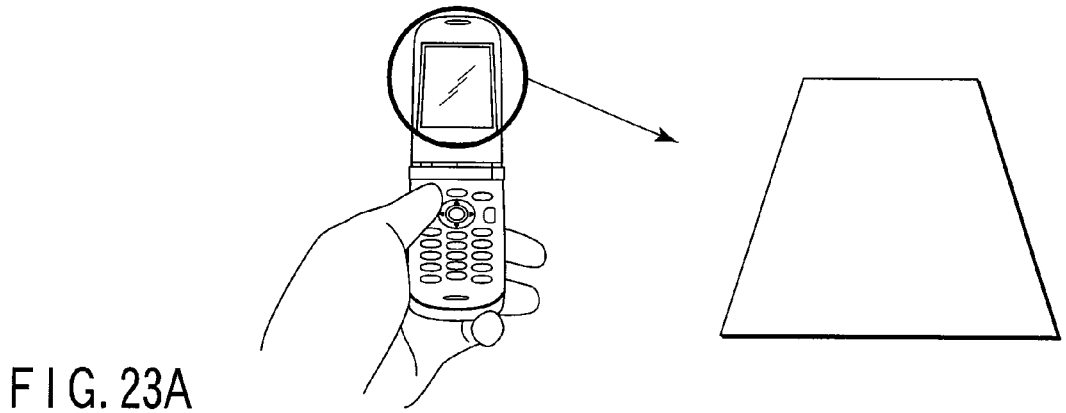
FIGS. 23A to 23D are views for explaining an example of the orientation of the portable phone terminal, how the display unit is seen from the viewing direction, and conversion by a display information conversion control unit.
Figure 23B:
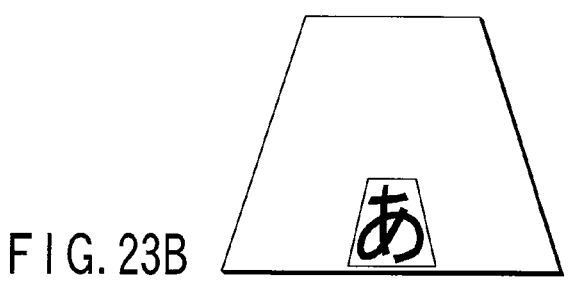
Figure 23C:
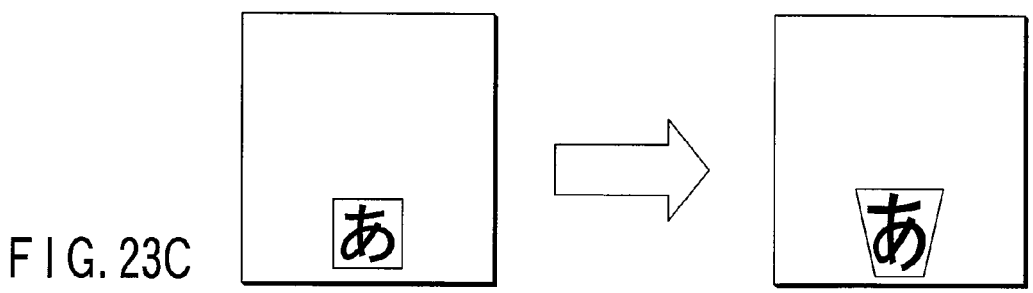
Figure 23D:
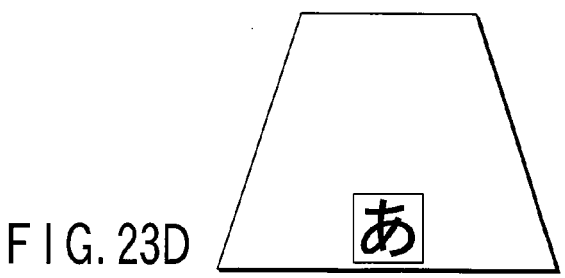

As the conversion by the display information conversion control unit 1902 and display information conversion unit 1903, rotational conversion by a one-dimensional parameter has been exemplified. However, the present embodiment is not limited to this. If orientation information is, e.g., three-dimensional, a perspective component in the depth direction exists. Hence, the display unit 106 is distorted and looks trapezoid, as shown in FIG. 23A (the shape is exaggerated for the explanation). In this case, information such as a character displayed on the screen is also distorted into a trapezoidal shape, as shown in FIG. 23B. Under these circumstances, the display information conversion control unit 1902 and display information conversion unit 1903 execute conversion control and processing to convert the character into an inverted trapezoid, as shown in FIG. 23C. Then, the user who views the display unit 106 in a slanting direction can view the character without distortion, as shown in FIG. 23D. As described above, a process using affine transformation for changing the parameter in accordance with the orientation of the terminal is also effective.

For the same reason, in the case shown in FIGS. 23A to 23D, the size of the observed character also changes between the near side (lower side of the screen) and the far side (upper side of the screen) of the screen viewed from the user (even when characters with the same size are displayed, they look large on the near side and small on the far side). A process of equalizing the apparent sizes in accordance with the orientation of the terminal is also effective. Information on the near side is easy to see. Hence, layout conversion can also effectively be performed to, e.g., change the layout of screen display information and display important information on the near side. A conversion process of changing the display area size, as described with reference to FIGS. 16A and 16B, is also effective. Other conversion processes can also be performed.

First Modification of Third Embodiment

Figure 24:
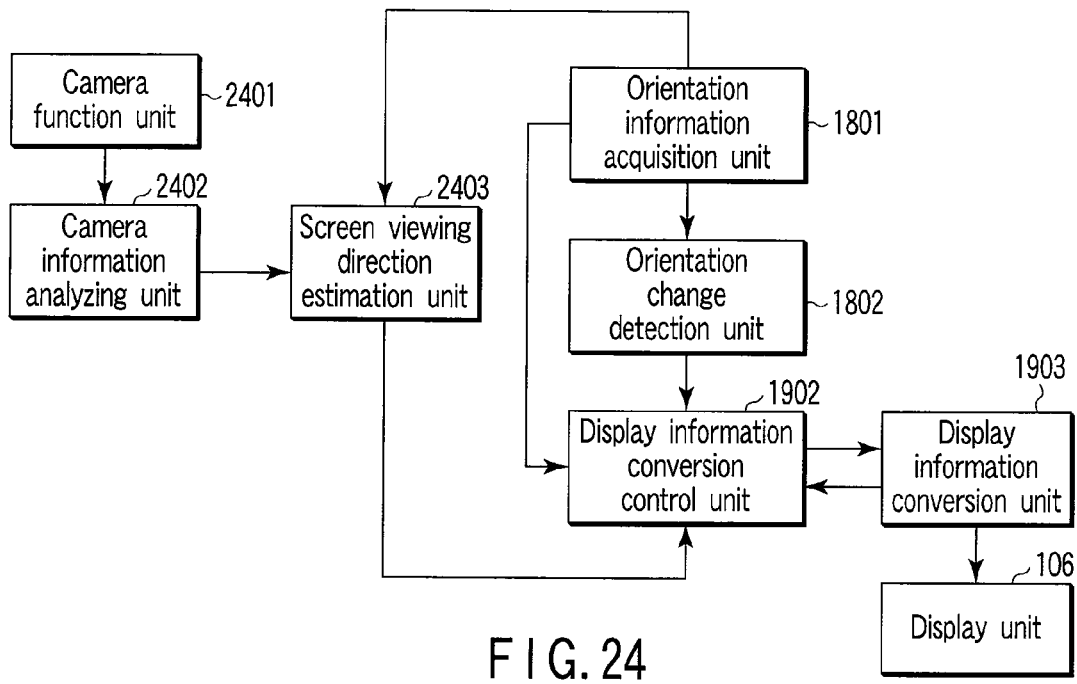
FIG. 24 is a block diagram of a screen display processing apparatus according to the first modification of the third embodiment.

The first modification of the third embodiment of the present embodiment includes a camera function unit 2401 and a camera information analyzing unit 2402 in addition to the screen display processing apparatus of the third embodiment shown in FIG. 19, and also includes a screen viewing direction estimation unit 2403 in place of the screen viewing direction estimation unit 1901, as shown in FIG. 24.

The camera function unit 2401 implements a camera and acquires external image information (e.g., a still image).

The camera information analyzing unit 2402 analyzes the image information obtained by the camera function unit 2401.

The screen viewing direction estimation unit 2403 estimates the user's screen viewing direction by using the analysis result of the camera information analyzing unit 2402 and at least one piece of orientation information acquired by an orientation information acquisition unit 1801.

<Camera Information Analyzing Unit 2402>

More specifically, the camera information analyzing unit 2402 analyzes an area that appears to be a face and the direction of the face in image information by using computer vision technologies such as face recognition. If the user is located in the image capturing range of the camera provided on the portable phone terminal, the face position of the user can be known. It is possible to more specifically estimate the user's screen viewing direction by using the analyzed face position information and face direction information in addition to the above-described orientation information of the display unit 106. More specifically, the direction vector from the camera to the user's face can be calculated on the basis of the position and direction information of the face captured by the camera. The direction vector from the display unit 106 to the user's face can be estimated by using the above direction vector and the information of the position and orientation relationship between the camera function unit 2401 and the display unit 106.

In the above-described third embodiment, it is necessary to estimate the direction in which the user views the screen of the display unit 106 on the basis of an assumption that the terminal user normally views the screen while facing the screen with the head vertical (when the user is standing or sitting in a chair). When the components of the first modification are added, the screen viewing direction estimation unit 2403 can estimate the screen viewing direction without such assumption.

Screen viewing direction estimation using face recognition has been exemplified above. However, the present embodiment is not limited to this. For example, when a portion that appears to be the sky, a fluorescent light, or a ceiling is recognized from image information acquired by the camera function unit 2401, the camera function unit 2401 can be regarded to be oriented upward. Conversely, when the floor or user's foot is recognized, the camera function unit 2401 can be regarded to be oriented downward. The orientation of the screen may be estimated from such information. Even without recognizing the user's face, the user's screen viewing direction can be estimated when the hair or a part of the user's body is captured.

Second Modification of Third Embodiment

Figure 25:
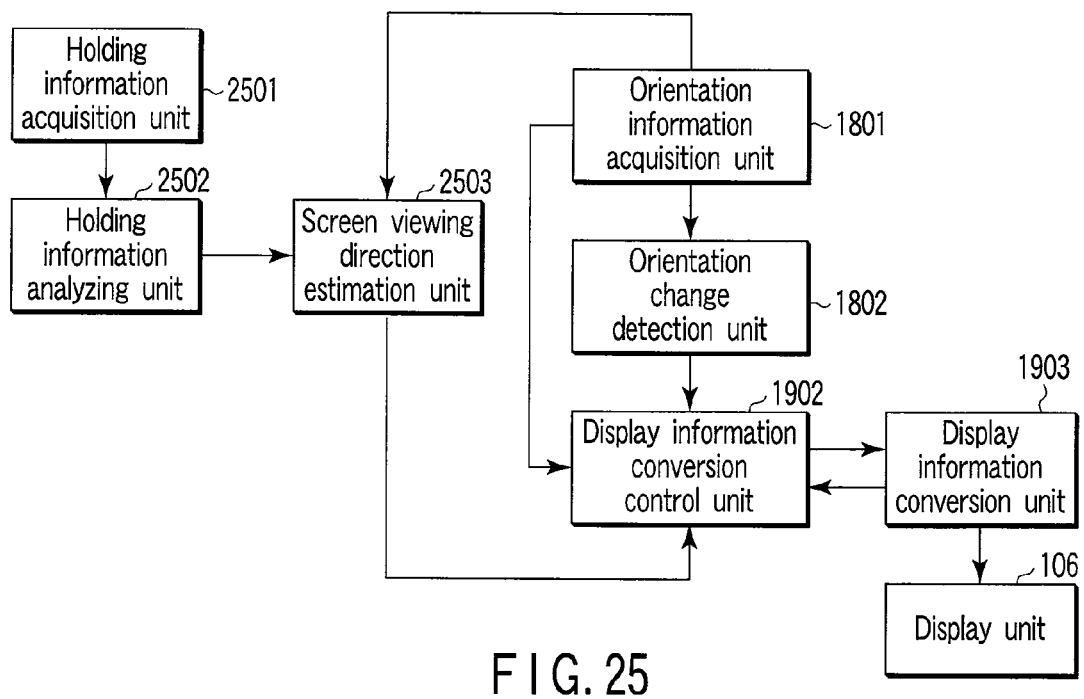
FIG. 25 is a block diagram of a screen display processing apparatus according to the second modification of the third embodiment.

The second modification of the third embodiment of the present embodiment includes a holding information acquisition unit 2501 and a holding information analyzing unit 2502, in addition to the screen display processing apparatus of the third embodiment shown in FIG. 19, and also includes a screen viewing direction estimation unit 2503 in place of the screen viewing direction estimation unit 1901, as shown in FIG. 25.

The holding information acquisition unit 2501 acquires terminal holding information.

The holding information analyzing unit 2502 analyzes the holding information acquired by the holding information acquisition unit 2501.

The screen viewing direction estimation unit 2503 estimates the user's screen viewing direction by using the analysis result of the holding information analyzing unit 2502 and at least one piece of orientation information acquired by an orientation information acquisition unit 1801.

<Holding Information Acquisition Unit 2501 and Holding Information Analyzing Unit 2502>

More specifically, the holding information acquisition unit 2501 is implemented by, e.g., a touch sensor. At least one touch sensor is arranged on at least one of the cases included in the terminal to acquire the terminal holding information (holding position, holding area, holding direction, holding angle, etc.) of the terminal user. The touch sensor acquires the coordinate values of a touched portion. For example, when one touch sensor acquires a plurality of coordinate values, an area formed by connecting the coordinate values can be regarded as a holding area. The touch sensor detects, e.g., only one finger by one sensor. Alternatively, a plurality of recognition units are provided on one sensor to detect, e.g., a plurality of fingers.

The holding information analyzing unit 2502 analyzes the user's terminal holding style on the basis of the holding information. For example, the user holds the terminal only on its right side or by gripping the lower case. The screen viewing direction estimation unit 2503 estimates the screen viewing direction by using the analyzed information.

As in the first modification of the third embodiment, since the user's terminal holding style can be known, the screen viewing direction can be estimated without based on the assumption that the terminal user normally views the screen while facing the screen with the head vertical (when the user is standing or sitting in a chair). Estimation can be done by an arbitrary method. For example, where the value of the touch sensor is large (e.g., the barycenter of the sensor values) is estimated as the lower side of the terminal. On the basis of this information and the orientation information of the terminal, the user's holding orientation is assumed, and the viewing direction is calculated. It is more effective, however, to make the user input information indicating left- or right-handedness into the terminal in advance and use this information.

Fourth Embodiment

<Overall Arrangement>

A screen display processing apparatus according to the fourth embodiment will be described with reference to FIG. 26.

The screen display processing apparatus of this embodiment includes an orientation information acquisition unit 1801, screen viewing direction estimation unit 2601, display information conversion control unit 2602, display information conversion unit 1903, moving mechanism unit 101, moving parameter acquisition unit 102, shape change detection unit 103, and display unit 106.

The screen viewing direction estimation unit 2601 estimates the terminal user's terminal screen viewing direction on the basis of a moving parameter acquired by the moving parameter acquisition unit 102 and/or at least one piece of orientation information acquired by the orientation information acquisition unit 1801.

The display information conversion control unit 2602 controls to convert display information of the terminal by using information representing the "presence" or "absence" of a shape change detected by the shape change detection unit 103, moving parameter information acquired by the moving parameter acquisition unit 102, and the screen viewing direction information estimated by the screen viewing direction estimation unit 2601.

<Screen Viewing Direction Estimation Unit 2601>

The screen viewing direction estimation unit 2601 can acquire orientation information including the position and orientation of the display unit 106 upon the shape change of the terminal by using the moving parameter acquired by the moving parameter acquisition unit 102.

As described in the third embodiment, the orientation of the terminal can be detected by using at least one piece of orientation information acquired by the orientation information acquisition unit 1801 and known information such as the sensor attachment positions, the number of attached sensors, and the attachment directions on the terminal. The screen viewing direction estimation unit 2601 calculates the orientation information of the display unit 106 by collectively using these pieces of acquired information.

<Display Information Conversion Control Unit 2602>

Unlike the display information conversion control unit 1902 of the third embodiment which uses orientation information and orientation change information, the display information conversion control unit 2602 uses moving parameter information and shape change information. The display information conversion control units 1902 and 2602 are the same except for this point. That is, as the characteristic feature, the display information conversion control unit 2602 controls to convert display information in accordance with the "presence" or "absence" of the shape change of the portable phone terminal and in accordance with the shape change, thereby producing various kinds of effects to, e.g., make the screen more visible in the screen viewing direction estimated by the screen viewing direction estimation unit 2601.

<Overall Operation>

In the above-described fourth embodiment, it is possible to change the display contents on the screen in accordance with the orientation corresponding to the shape change and/or the shape of the portable phone terminal. When providing screen display corresponding to the shape change of the portable phone terminal, the user can view display information without caring about the orientation of the portable phone terminal at that time.

Figure 27A:
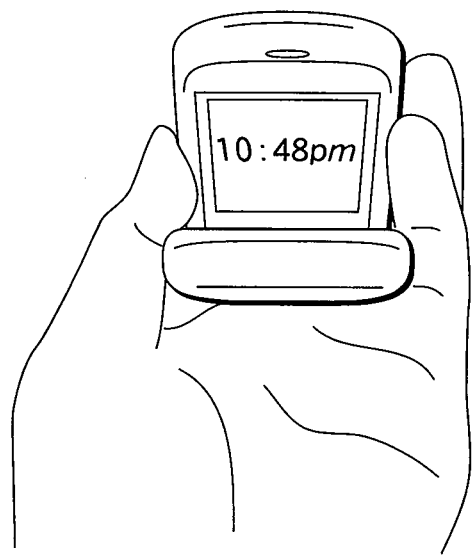
FIGS. 27A and 27B are views for explaining a difference in screen visibility according to a shape change caused by moving a moving part of a folding type portable phone terminal and the orientation at that time.
Figure 27B:
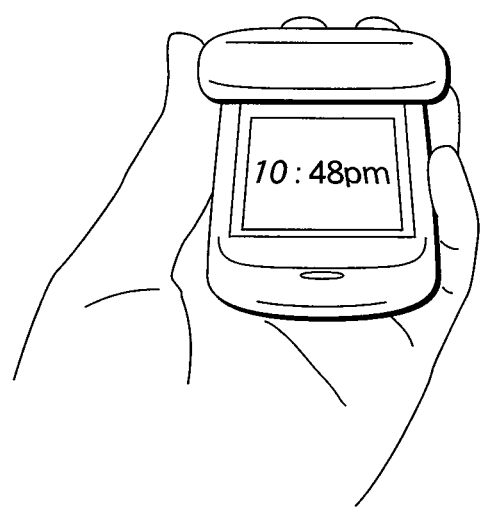

FIGS. 27A and 27B show examples in which the user changes the shape of the portable phone terminal in different orientations.

In FIG. 27A, the portable phone terminal is opened while placing a lower case 202 on the lower side. That is, the angle made by an upper case 201 and the lower case 202 is changed by using the moving mechanism unit 101. In FIG. 27B, the portable phone terminal is opened while placing the upper case 201 on the lower side. That is, the angle made by the upper case 201 and lower case 202 is changed by using the moving mechanism unit 101. In FIG. 27A, the screen viewing direction matches the display direction of the display unit 106. In FIG. 27B, the screen viewing direction is reverse to the display direction (rotated by about 180°). Assume that the screen display is to be changed in accordance with the shape change in this state, as described in the first embodiment. By using the orientation information acquired by the orientation information acquisition unit 1801 together, for example, the display direction of the display unit 106 can be converted in accordance with the direction estimated by the screen viewing direction estimation unit 2601 so that the user can easily view the screen display on the display unit 106 without changing the orientation. This embodiment aims at this effect.

With this arrangement, when the user wants to check the time on, e.g., a folding type portable phone terminal without a sub screen (rear screen), he/she can check the time by opening the portable phone slightly and taking a peep at the screen through the crack without caring about the orientation of the portable phone (as in FIG. 27A or 27B). The present inventors call this information viewing method "peep". This information viewing method is very effective because information access is easy, and the element of the light amount manner mode described in the sixth modification of the first embodiment is also incorporated.

First Modification of Fourth Embodiment

Figure 28:
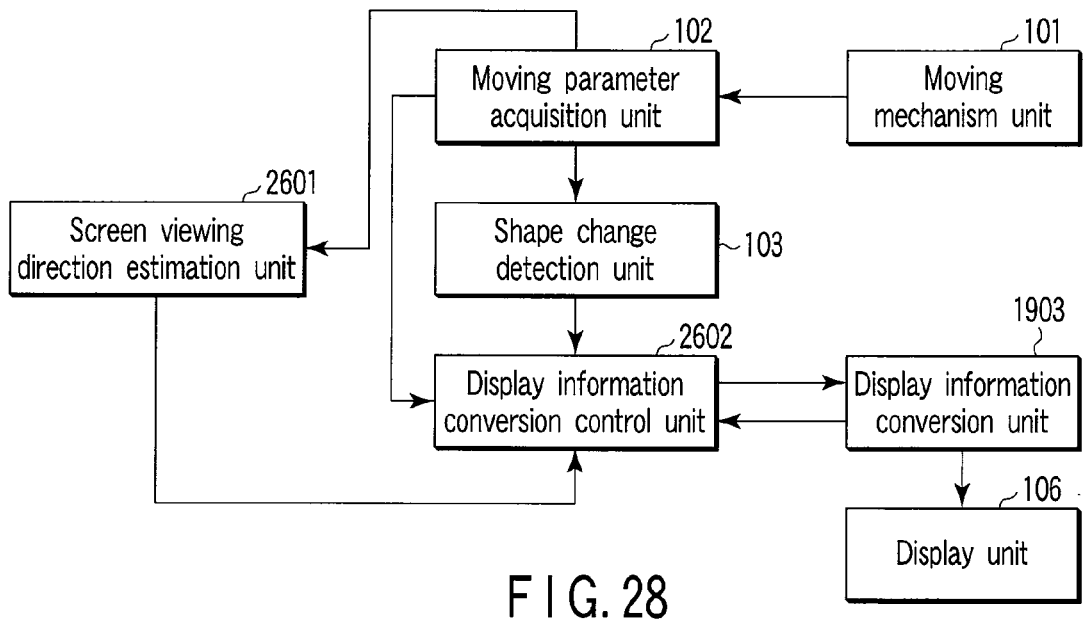
FIG. 28 is a block diagram of a screen display processing apparatus according to the first modification of the fourth embodiment.

In this modification, the orientation information acquisition unit 1801 is removed from the screen display processing apparatus of the fourth embodiment, as shown in FIG. 28. This modification is the same as the fourth embodiment except that the user's screen viewing direction is estimated from the shape and shape change information.

In the fourth embodiment, the first to third embodiments and their modifications can be combined as needed. This is very effective because the effects described in the embodiments and modifications and the effect of the fourth embodiment produce synergy.

Fifth Embodiment

<Overall Arrangement>

An arrangement of the fifth embodiment of the present embodiment is obtained by adding an ambient environment information acquisition unit 2901 for acquiring ambient environment information to the first to fourth embodiments.

<Ambient Environment Information Acquisition Unit 2901>

The ambient environment information acquisition unit 2901 acquires the information of the light amount of the ambient environment and is realized by using, e.g., an actinometer, illuminometer, luminance meter, photosensor, photodiode, or the like. The brightness of the ambient environment of the terminal can be known by the ambient environment information acquisition unit 2901.

Figure 29:
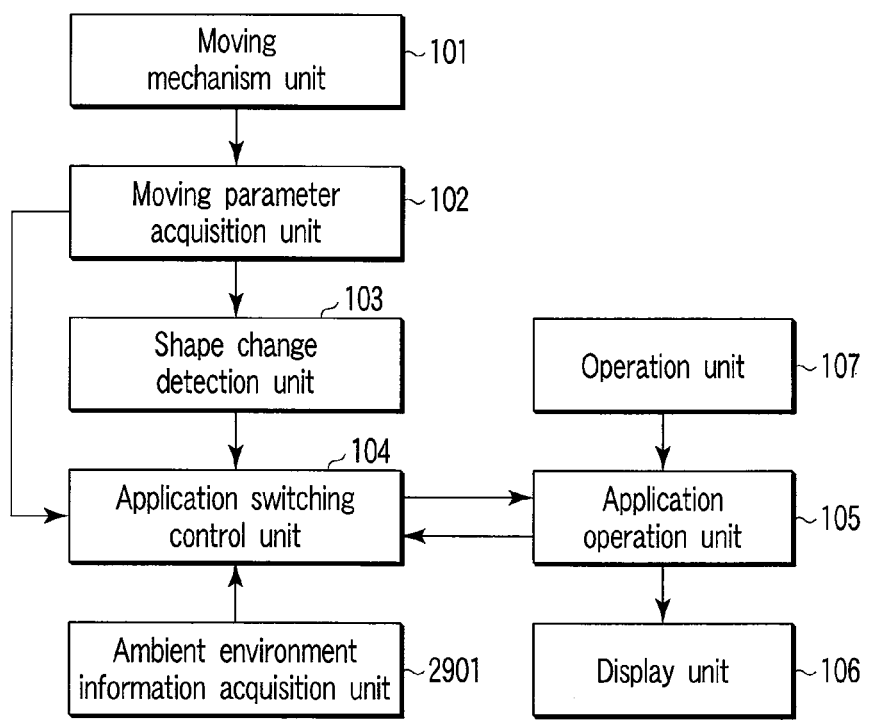
FIG. 29 is a block diagram of a screen display processing apparatus according to the fifth embodiment corresponding to the first embodiment.
Figure 30:
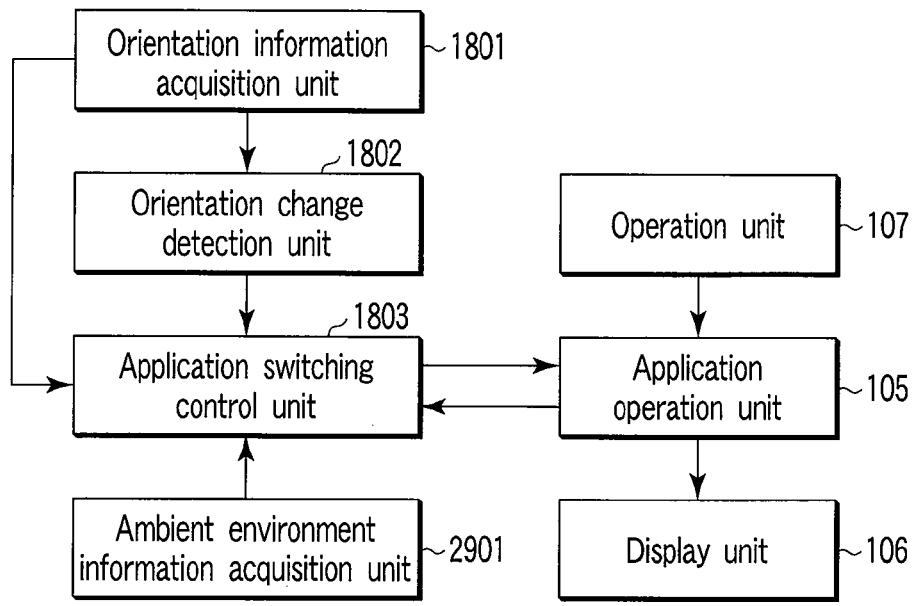
FIG. 30 is a block diagram of a screen display processing apparatus according to the fifth embodiment corresponding to the second embodiment.

When the ambient environment information acquisition unit 2901 is added to the first embodiment (FIG. 29) (or the second embodiment (FIG. 30)), the ambient environment information acquisition unit 2901 transmits acquired ambient environment information to the application switching control unit 104 (in the second embodiment, the application switching control unit 1803; the same applies hereinafter). The application switching control unit 104 decides the control contents on the basis of both the conventional information and the ambient environment information. For example, the application switching control unit 104 controls to change the application to be activated, the mode of the application, or the screen layout of the application in accordance with the brightness of the ambient environment.

When the ambient environment information acquisition unit 2901 is added to the sixth modification of the first embodiment, the ambient environment information acquisition unit 2901 transmits acquired ambient environment information to the light amount change control unit 1501. The light amount change control unit 1501 decides the control contents on the basis of both the conventional information and the ambient environment information. For example, control is done to reduce the light-emitting amount when the ambient environment is dark.

Figure 31:
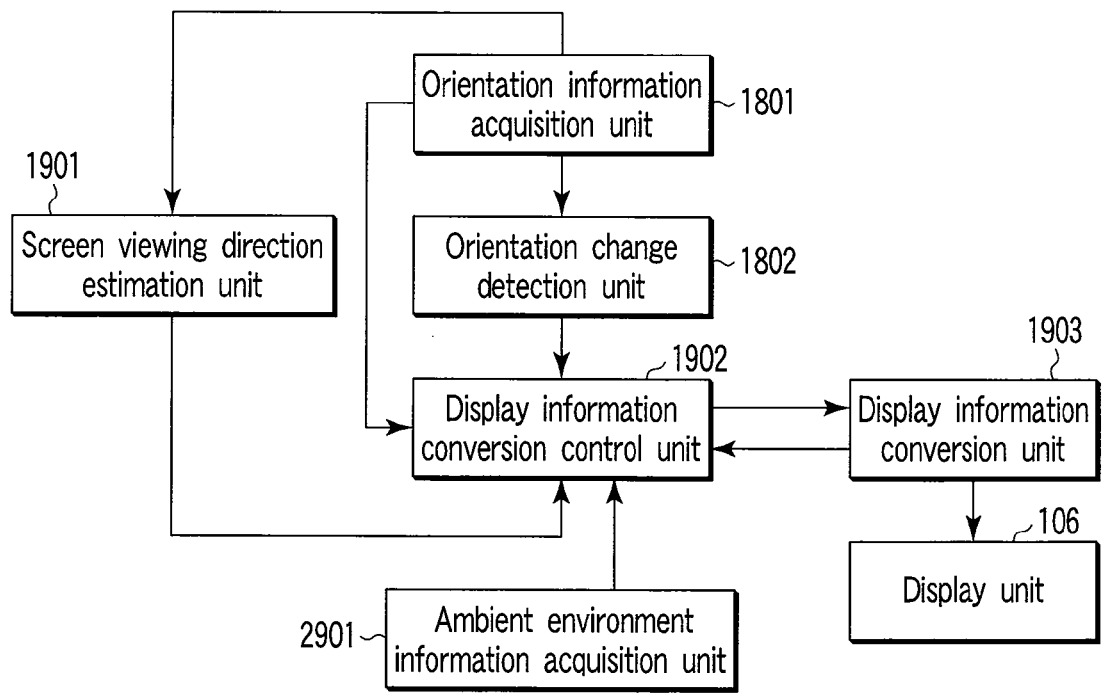
FIG. 31 is a block diagram of a screen display processing apparatus according to the fifth embodiment corresponding to the third embodiment.
Figure 34:
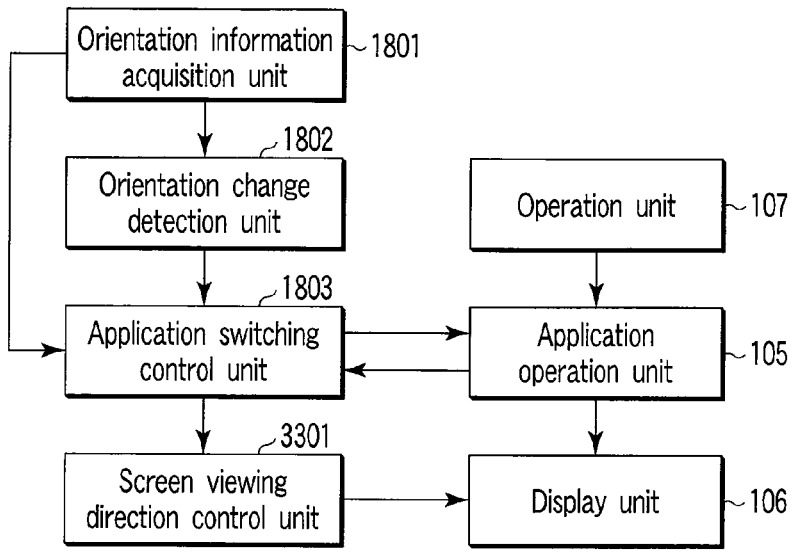
FIG. 34 is a block diagram of a screen display processing apparatus according to the sixth embodiment corresponding to the second embodiment.
Figure 35:
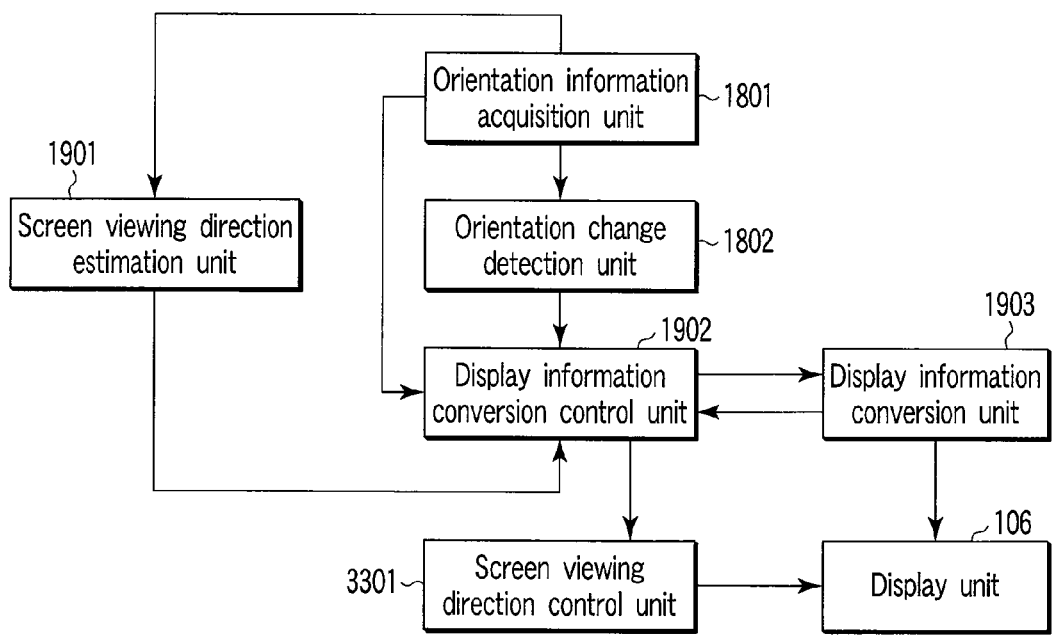
FIG. 35 is a block diagram of a screen display processing apparatus according to the sixth embodiment corresponding to the third embodiment.
Figure 36:
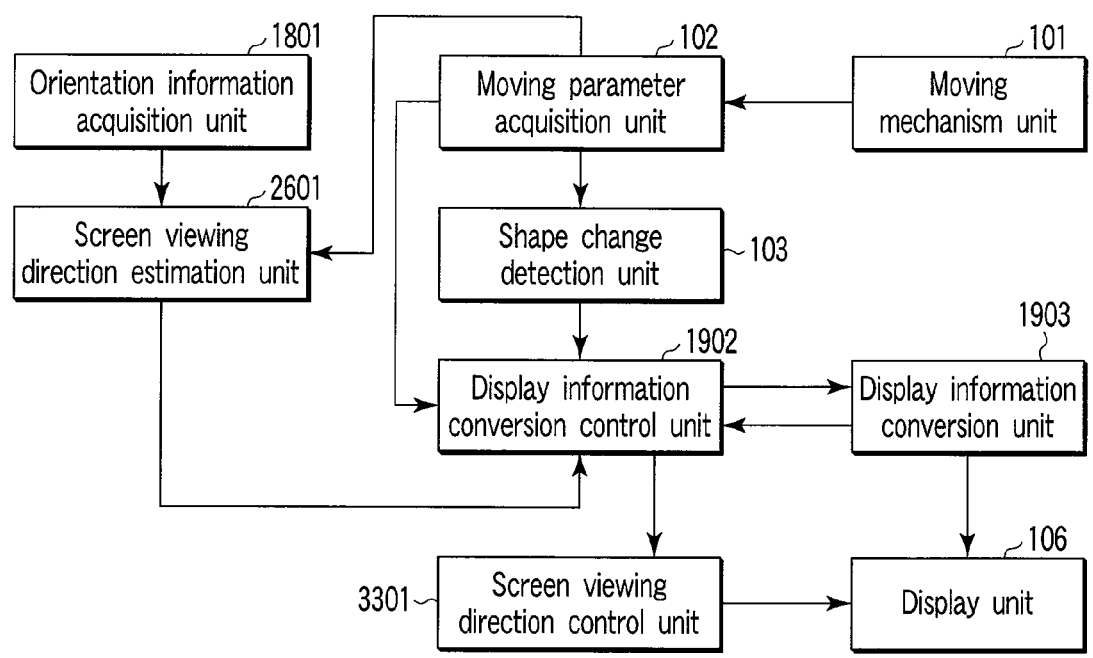
FIG. 36 is a block diagram of a screen display processing apparatus according to the sixth embodiment corresponding to the fourth embodiment.
Figure 37:
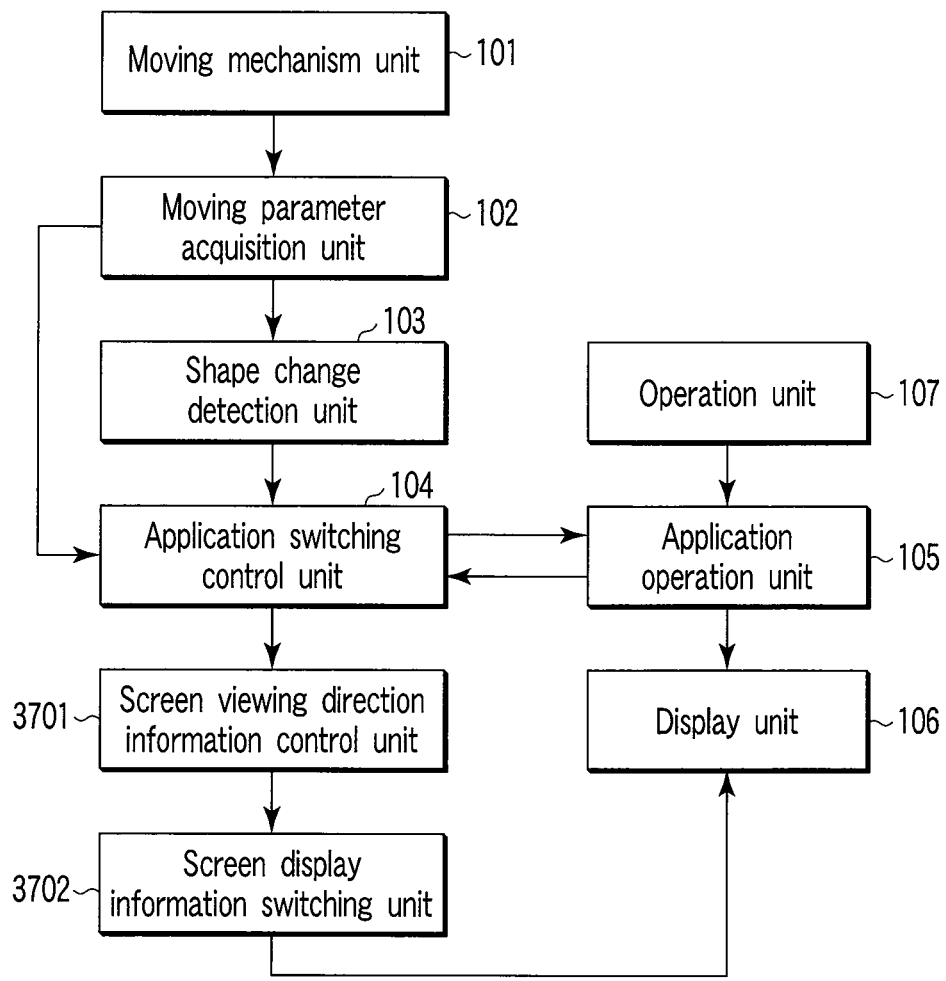
FIG. 37 is a block diagram of a screen display processing apparatus according to the first modification of the sixth embodiment corresponding to the first embodiment.
Figure 38:
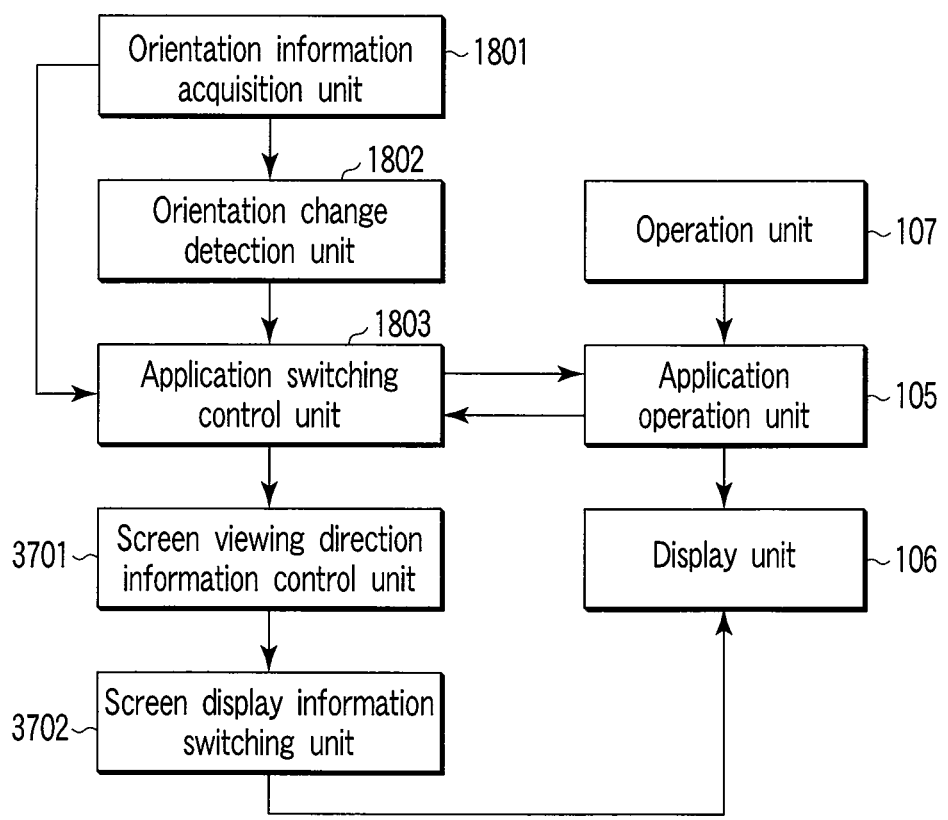
FIG. 38 is a block diagram of a screen display processing apparatus according to the first modification of the sixth embodiment corresponding to the second embodiment.

When the ambient environment information acquisition unit 2901 is added to the third embodiment (FIG. 31) (or the fourth embodiment (FIG. 32)), the ambient environment information acquisition unit 2901 transmits acquired ambient environment information to the display information conversion control unit 1902. The display information conversion control unit 1902 decides the control contents on the basis of both the conventional information and the ambient environment information. For example, control is performed to change the method of converting the display layout, display area size, and display information shape in accordance with the brightness of the ambient environment.

In the above description, the ambient environment information acquisition unit 2901 is implemented by using, e.g., an actinometer, illuminometer, luminance meter, photosensor, photodiode, or the like. However, the present embodiment is not limited to this. The ambient environment information acquisition unit 2901 may be implemented by using the camera function imparted to the portable phone terminal. In this case, the average brightness of image capturing information of the camera is usable.

Sixth Embodiment

<Overall Arrangement>

An arrangement of the sixth embodiment of the present embodiment is obtained by adding a screen viewing direction control unit 3301 for controlling the viewing enable direction of the screen of the terminal to the first to fourth embodiments. FIGS. 33 to 36 show the sixth embodiment, which corresponds to the first to fourth embodiments.

<Screen Viewing Direction Control Unit>

The screen viewing direction control unit 3301 controls the viewing direction of the screen on a display unit 106 of the terminal. For example, the user can see the screen from the front (near the normal direction of the screen) but cannot see the screen when the angle with respect to the screen is large (the angle made by the normal direction of the screen is large). This function is almost equivalent to the privacy filter of a portable phone. The control may be reversed.

The screen viewing direction control unit 3301 can be implemented by a liquid crystal or digital lens which changes the light passing direction depending on, e.g., an applied voltage. Alternatively, a slit mechanism (this mechanism can be implemented by, e.g., a liquid crystal) capable of controlling a slit pattern is inserted between the FPD and the backlight, and the slit pattern is changed. The method of realization is not limited to this, and the screen viewing direction control unit 3301 can be implemented by any appropriate method.

According to this embodiment, when the arrangement is added to, e.g., the third embodiment (FIG. 35), the window is changed in accordance with the orientation change of the terminal so that the user can easily see the screen from the viewing direction. At this time, viewing is enabled from the user's viewing direction but disabled from other directions. This allows the user to easily view information and also prevents any person other than the user from viewing the information. Hence, private information can be displayed without any problem. Any person other than the user is prevented from viewing the information. In other words, the screen is only visible from the user's direction. This is therefore effective even regarding the "light amount manner mode".

First Modification of Sixth Embodiment

A screen display processing apparatus of this modification has a screen viewing direction information control unit 3701 and a screen display information switching unit 3702 in place of the screen viewing direction control unit 3301. FIGS. 37 to 40 show this modification, which corresponds to the first to fourth embodiments.

The screen viewing direction information control unit 3701 controls to change the screen information to be displayed on the screen in accordance with the terminal screen viewing direction. For example, control is done to change the display contents on the screen depending on whether the display unit 106 is viewed from the right or left. The screen viewing direction information control unit 3701 controls to present different display contents in accordance with the plurality of screen viewing directions of the portable terminal apparatus.

The screen display information switching unit 3702 switches the display contents on the display unit 106 in accordance with the control contents of the screen viewing direction information control unit 3701. The screen display information switching unit 3702 switches the display contents on the display unit 106 in accordance with the control contents of the user's viewing direction. This can be implemented by arranging a renticular lens on the upper side of the screen or inserting a slit mechanism (this mechanism can be implemented by, e.g., a liquid crystal) capable of changing a slit pattern between the screen and the backlight.

When the arrangement of the first modification of the sixth embodiment of the present embodiment is added to, e.g., the fourth embodiment, information the user can see on the screen can be changed in accordance with his/her viewing direction. For example, it is possible to present information 1 (e.g., mail) when the user changes the shape of the terminal and sees it in orientation 1, and another type of information 2 (e.g., time) when the user sees the terminal in orientation 2.

According to the above-described embodiments, appropriate screen display can be done in accordance with a situation by using the mechanism of the cases of the portable phone terminal and effectively utilizing the shape change and orientation change upon a change of the mechanism. That is, it is possible to solve various problems related to the operation of the conventional portable phone terminal, including the problems regarding the operability, user friendliness of applications, mechanism utilization, screen visibility, the manner mode for light leakage, and privacy protection in screen display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A screen display processing apparatus used for a portable terminal apparatus comprising:
an acquisition unit configured to acquire orientation information representing an orientation of a case included in the portable terminal apparatus;

a determination unit configured to determine based on the orientation information whether the orientation changes;

an estimation unit configured to estimate, based on the orientation information, a viewing direction in which a user of the portable terminal apparatus views a screen of the portable terminal apparatus;

a control unit configured to control a function about the screen display provided in the portable terminal apparatus in accordance with the orientation information, the viewing direction, and the change or no change in the orientation such that contents are displayed without distortion resulting from the orientation information and the viewing direction; and a holding information acquisition unit configured to acquire holding information representing user's terminal holding style of the portable terminal apparatus, the holding information including at least one of holding position, holding area, holding direction, and holding angle of the user;

wherein the estimation unit estimates the viewing direction based on the holding information and the orientation, the holding information acquisition unit acquires, by using a contact sensor, the holding information based on one or a plurality of positions in which the user holds the portable terminal apparatus;

wherein when the case is in a first position, the control unit outputs a first application on the screen, and when the case is in a second, different position, the control unit outputs a second, different application on the screen, and wherein when the case returns to the first position, the control unit restores the first application on the screen.

2. The apparatus according to claim 1, further comprising:
a second control unit configured to control information to be displayed on each of at least two screens provided on the portable terminal apparatus; and
a switching unit configured to switch a window to be displayed between at least two screens.

3. The apparatus according to claim 1, wherein the first control unit switches an application or starts an application.

4. The apparatus according to claim 1, wherein the first control unit controls one of a brightness amount and a light-emitting amount of at least one screen provided on the portable terminal apparatus.

5. The apparatus according to claim 1, wherein
the moving unit moves the cases via a hinge, and
the detection unit detects, as the parameter value, an angle made by the cases when the hinge rotationally moves.

6. The apparatus according to claim 1, wherein
the moving unit moves the cases by a sliding mechanism, and
the detection unit detects, as the parameter value, a position change amount between the cases by the sliding mechanism.

7. The apparatus according to claim 1, further comprising a direction control unit configured to control a viewing enable direction in which the contents to be displayed on the screen of the portable terminal apparatus is viewed, and
wherein the direction control unit limits the contents changed by the change unit to the viewing enable direction.

8. The apparatus according to claim 1, further comprising:
a second control unit configured to control the change unit to present different display contents in accordance with viewing directions of the screen of the portable terminal apparatus; and a switching unit configured to switch the contents changed by the change unit in accordance with the viewing direction of the user.

9. The apparatus according to claim 1, further comprising a light amount acquisition unit configured to acquire information of a light amount of an ambient environment, and
wherein the change unit changes at least one of the layout, the size, the shape, the display area, and the display position based on the information of the light amount.

10. The apparatus according to claim 9, wherein the light amount acquisition unit acquires the light amount by using at least one of an actinometer, an illuminometer, a luminance meter, a photosensor, and a photodiode.

11. The apparatus according to claim 9, wherein the light amount acquisition unit acquires the light amount by using a camera function.

12. The apparatus according to claim 1, further comprising a switching unit configured to switch whether to cause the change unit to change at least one of the layout, the size, the shape, the display area, and the display position.

13. The apparatus according to claim 12, wherein the switching unit executes switching by using a button included in the portable terminal apparatus.

14. The apparatus according to claim 13, wherein the button includes a manner mode button.

15. A screen display processing apparatus used for a portable terminal apparatus comprising:
a moving unit configured to relatively move a plurality of cases of the portable terminal apparatus;
a detection unit configured to detect a parameter value representing a degree of relative movement of the cases;
a determination unit configured to determine based on the parameter value whether a shape of the portable terminal apparatus changes;
an acquisition unit configured to acquire orientation information representing an orientation of at least one case of the portable terminal apparatus;
an estimation unit configured to estimate, based on the parameter value, the orientation information, and the change or no change in the shape, a viewing direction in which a user of the portable terminal apparatus views a screen of the portable terminal apparatus;
a control unit configured to control a function about the screen display provided in the portable terminal apparatus in accordance with the viewing direction such that contents are displayed without distortion resulting from the parameter value, orientation information, and the viewing direction; and
a holding information acquisition unit configured to acquire holding information representing user's terminal holding style of the portable terminal apparatus, the holding information including at least one of holding position, holding area, holding direction, and holding angle of the terminal user;
wherein the estimation unit estimates the viewing direction based on the holding information,
the holding information acquisition unit acquires, by using a contact sensor, the holding information based on one or a plurality of positions in which the user holds the portable terminal apparatus;
wherein when the case is in a first position, the control unit outputs a first application on the screen, and when the case is in a second, different position, the control unit outputs a second, different application on the screen, and wherein when the case returns to the first position, the control unit restores the first application on the screen.

16. The apparatus according to claim 15, further comprising:
- a second control unit configured to control information to be displayed on each of at least two screens provided on the portable terminal apparatus; and
- a switching unit configured to switch a window to be displayed between at least two screens.

17. The apparatus according to claim 15, wherein the first control unit switches an application or starts an application.

18. The apparatus according to claim 15, wherein the first control unit controls one of a brightness amount and a light-emitting amount of at least one screen provided on the portable terminal apparatus.

19. The apparatus according to claim 15, wherein
- the moving unit moves the cases via a hinge, and
- the detection unit detects, as the parameter value, an angle made by the cases when the hinge rotationally moves.

20. The apparatus according to claim 15, wherein
- the moving unit moves the cases by a sliding mechanism, and
- the detection unit detects, as the parameter value, a position change amount between the cases by the sliding mechanism.

21. The apparatus according to claim 15, further comprising a direction control unit configured to control a viewing enable direction in which the contents to be displayed on the screen of the portable terminal apparatus is viewed, and
- wherein the direction control unit limits the contents changed by the change unit to the viewing enable direction.

22. The apparatus according to claim 15, further comprising:
- a second control unit configured to control the change unit to present different display contents in accordance with viewing directions of the screen of the portable terminal apparatus; and
- a switching unit configured to switch the contents changed by the change unit in accordance with the viewing direction of the user.

23. The apparatus according to claim 15, further comprising a light amount acquisition unit configured to acquire information of a light amount of an ambient environment, and
- wherein the change unit changes at least one of the layout, the size, the shape, the display area, and the display position based on the information of the light amount.

24. The apparatus according to claim 23, wherein the light amount acquisition unit acquires the light amount by using at least one of an actinometer, an illuminometer, a luminance meter, a photosensor, and a photodiode.

25. The apparatus according to claim 23, wherein the light amount acquisition unit acquires the light amount by using a camera function.

26. The apparatus according to claim 15, further comprising a switching unit configured to switch whether to cause the change unit to change at least one of the layout, the size, the shape, the display area, and the display position.

27. The apparatus according to claim 26, wherein the switching unit executes switching by using a button included in the portable terminal apparatus.

28. The apparatus according to claim 27, wherein the button includes a manner mode button.

* * * * *